(12) United States Patent
Lerman et al.

(10) Patent No.: US 12,488,008 B2
(45) Date of Patent: *Dec. 2, 2025

(54) SUPPRESSING DUPLICATE LISTINGS ON A SEARCH PROVIDER SYSTEM

(71) Applicant: Yext, Inc., New York, NY (US)

(72) Inventors: Howard C. Lerman, New York, NY (US); Thomas C. Dixon, New York, NY (US); Kevin Caffrey, Alexandria, VA (US); David C. Lin, New York, NY (US)

(73) Assignee: YEXT, INC., New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/239,445

(22) Filed: Aug. 29, 2023

(65) Prior Publication Data

US 2023/0409583 A1 Dec. 21, 2023

Related U.S. Application Data

(63) Continuation of application No. 17/351,956, filed on Jun. 18, 2021, now Pat. No. 11,775,537, which is a
(Continued)

(51) Int. Cl.
*G06F 16/00* (2019.01)
*G06F 16/2457* (2019.01)
(Continued)

(52) U.S. Cl.
CPC ...... *G06F 16/24578* (2019.01); *G06F 16/248* (2019.01); *G06F 16/951* (2019.01);
(Continued)

(58) Field of Classification Search
None
See application file for complete search history.

(56) References Cited

U.S. PATENT DOCUMENTS 5,913,208 A * 6/1999 Brown ............. G06F 16/951
707/999.005
6,081,805 A * 6/2000 Guha ............... G06F 16/2255
707/999.005

(Continued)

OTHER PUBLICATIONS

Shotland, "The Definitive Guide to Duplicate Listings," Yext Inc., 15 pages.

(Continued)

*Primary Examiner* — Farhan M Syed
(74) *Attorney, Agent, or Firm* — Jeffri A. Kaminski; Venable LLP

(57) ABSTRACT

In one implementation, a method is provided that designates a first listing corresponding to a first web address as a representative listing of an entity. A provider system is searched to identify a second listing associated with the entity, wherein the second listing corresponds to a second web address. A determination is made that the second listing satisfies matching criteria associated with the first listing. An instruction to suppress the second listing on the provider system is received from a system associated with the entity. A request to suppress the second listing associated with the entity is transmitted to the provider system. An indication that the second listing is suppressed on the provider system is received, where, in response to a request to access the second web address associated with the second listing, a web browser is redirected to the first web address associated with the first listing.

20 Claims, 24 Drawing Sheets

Related U.S. Application Data continuation of application No. 16/242,470, filed on Jan. 8, 2019, now Pat. No. 11,074,263, which is a continuation of application No. 15/342,397, filed on Nov. 3, 2016, now Pat. No. 10,216,807, which is a continuation of application No. 15/083,979, filed on Mar. 29, 2016, now Pat. No. 9,519,721, which is a continuation of application No. 14/793,904, filed on Jul. 8, 2015, now Pat. No. 9,361,388, which is a continuation of application No. 14/793,263, filed on Jul. 7, 2015, now Pat. No. 9,443,025.

(51) Int. Cl.
  *G06F 16/248* (2019.01)
  *G06F 16/951* (2019.01)
  *G06F 16/9535* (2019.01)
  *G06F 16/9537* (2019.01)
  *G06F 16/9538* (2019.01)

(52) U.S. Cl.
  CPC ...... *G06F 16/9535* (2019.01); *G06F 16/9537* (2019.01); *G06F 16/9538* (2019.01)

(56) References Cited

U.S. PATENT DOCUMENTS

| | | | |
|---|---|---|---|
| 7,603,370 B2 * | 10/2009 | Manasse | G06F 16/90335 707/999.102 |
| 7,698,331 B2 | 4/2010 | Carson, Jr. | |
| 8,412,709 B1 | 4/2013 | Belwadi | |
| 8,626,766 B1 | 1/2014 | Srivastava | |
| 8,818,839 B2 | 8/2014 | Leff | |
| 8,819,058 B2 * | 8/2014 | Lerman | G06F 16/156 707/769 |
| 8,819,062 B2 | 8/2014 | Lerman | |
| 9,298,836 B1 * | 3/2016 | Lerman | G06F 16/24556 |
| 9,361,388 B1 | 6/2016 | Lerman | |
| 9,443,025 B1 | 9/2016 | Lerman | |
| 9,519,721 B1 | 12/2016 | Lerman | |
| 10,216,807 B2 | 2/2019 | Lerman | |
| 2005/0210043 A1 * | 9/2005 | Manasse | G06F 16/958 707/E17.14 |
| 2006/0161534 A1 * | 7/2006 | Carson, Jr. | G06F 16/951 |
| 2007/0192087 A1 | 8/2007 | Kim | |
| 2007/0253594 A1 | 11/2007 | Lu | |
| 2008/0065630 A1 | 3/2008 | Luo | |
| 2008/0177994 A1 | 7/2008 | Mayer | |
| 2008/0288509 A1 * | 11/2008 | Mysen | G06F 16/951 |
| 2009/0287742 A1 | 11/2009 | Woolston | |
| 2009/0290764 A1 | 11/2009 | Fiebrink | |
| 2010/0049711 A1 | 2/2010 | Singh | |
| 2010/0070523 A1 | 3/2010 | Delgo | |
| 2010/0174710 A1 | 7/2010 | Carson, Jr. | |
| 2010/0205541 A1 * | 8/2010 | Rapaport | G06Q 30/02 715/753 |
| 2010/0306193 A1 | 12/2010 | Pereira | |
| 2013/0085804 A1 * | 4/2013 | Leff | G06Q 30/0201 705/7.29 |
| 2013/0173654 A1 * | 7/2013 | Lerman | G06F 16/156 707/769 |
| 2014/0129591 A1 * | 5/2014 | Lerman | G06F 16/951 707/770 |

OTHER PUBLICATIONS

International Search Report and Written Opinion for PCT/US16/40459, mailed Sep. 22, 2016, 12 pages.

* cited by examiner

Exemplary List of All of the Listings that Should have a List of Structured Lists (as Created for a Provider)

```xml
<?xml version="1.0" encoding="UTF-8"?>
<listings>
  <listing>
    <locationId>113244</locationId>                    ← 702
    <externalId>264917653</externalId>                 ← 704
    <tag>Free 7-Day Trial</tag>
    <name>Onelife Fitness</name>                        ← 706
    <untrackedPhone>
      <countryCode>1</countryCode>
      <number>7575991888</number>
    </untrackedPhone>
    <address>
      <street>815 Middle Ground Blvd</street>
      <city>Newport News</city>
      <state>VA</state>
      <postalCode>23606</postalCode>
    </address>
    <geoTarget>
      <latitude>37.094926</latitude>
      <longitude>-76.471551</longitude>
      <visibilityRadius>1.0</visibilityRadius>
    </geoTarget>
    <hours>
    </hours>
    <categories>
      <category id="805102">Health Care Facilities</category>
      <category id="809907">Health Services</category>
      <category id="809921">Wellness Programs</category>
      <category id="809999">Health & Allied Services</category>
    </categories>
    <bios>
    </bios>
    <images>
    </images>
    <testimonials>
    </testimonials>
```

FIG. 7A

```xml
<lists>
  <list>
    <id>7523547</id>
    <name>Breakfast</name>
    <type>MENU</type>
    <description>Menu</description>
  </list>
  <list>
    <id>3612738</id>
    <name>Knick Knacks</name>
    <type>PRODUCTS</type>
    <description>Products</description>
  </list>
</lists>
```

FIG. 7B

```
<listing>                                                               ⌐708
    <locationId>113245</locationId>
    <externalId>266147109</externalId>
    <tag>Free 7-Day Trial</tag>
    <name>Onelife Fitness</name>
    <untrackedPhone>
      <countryCode>1</countryCode>
      <number>7575995433</number>
    </untrackedPhone>
    <address>
      <street>11805 Fountain Way</street>
      <city>Newport News</city>
      <state>VA</state>
      <postalCode>23606</postalCode>
    </address>
    <geoTarget>
      <latitude>37.08551</latitude>
      <longitude>-76.473097</longitude>
      <visibilityRadius>1.0</visibilityRadius>
    </geoTarget>
    <hours>
    </hours>
    <categories>
      <category id="805102">Health Care Facilities</category>
      <category id="809907">Health Services</category>
      <category id="809921">Wellness Programs</category>
      <category id="809999">Health & Allied Services</category>
    </categories>
    <bios>
    </bios>
    <images>
    </images>
    <testimonials>
    </testimonials>
</listing>                                                              ⌐710
```

FIG. 7C

Exemplary Receipt File Containing the Listings of Fig. 7A - 7C

```
"provider_id_to_yext_id_receipt" : [
    {
        "yext_id" : 131528,          — 806
        "provider_id" : "AJUDPj6"    — 804   } 802
            URL1
    },
    {
        "yext_id" : 137013,
        "provider_id" : "AJUDxsJ"
            URL2
    },
    {
        "yext_id" : 132057,
        "provider_id" : "AJUD57z"
            URL3
    },
    {
        "yext_id" : 130610,
        "provider_id" : "AJUEX_q"
            URL4
    },
    {
        "yext_id" : 117762,
        "provider_id" : "AJUEjh0"
            URL5
    }
    ...
}
```

YEXT  LOCATION CMS  LISTINGS  SOCIAL  PAGES  ANALYTICS  ALERTS☑ ROB FIG  HELP

PUBLISHERS  AGGREGATORS  •SUPPRESSIONS

STATUS
• ALL STATUES (316)
SUPPRESSED (200)
PROCESSING (21)
UNAVAILABLE (3)

SITES
• ALL SITES (316)
2FINDLOCAL (6)
411 (6)
B COUPONS (6)
ALL LOCAL (6)
AIRYELL (6)
AMERICAN TOWNS (6)
AVANTAR (6)
BING (6)
CHAMBEROFCOMMERCE.COM (6)
CITYBOT (6)

SHOW ALL SITES ▼

SEARCH [         ] [SEARCH]  ADVANCED FILTER

COLUMNS ▼  SHOW [25 ▼]  1-25 OF 294 [▲▼]

| SITE | SITE NAME | LOCATION | STATUS | URL | LAST STATUS CHANGE ▼ |
|---|---|---|---|---|---|
| ⊙ | 2FINDLOCAL | ALFREDO PIZZA<br>2 MADISON AVE<br>NEW YORK, NY 10010<br>(212)555-5451 | ✓ SUPPRESSED<br>REDIRECT | HTTPS://WWW.2FINDLOCAL.COM/B/<br>9292014/ALFREDO-PIZZA-PLE-NEW-<br>YORK-NY | 05/18/2014<br>08:53PM ET |
| ⊙ | 2FINDLOCAL | ALFREDO PIZZA PLE<br>1 MADISON AVE<br>NEW YORK, NY 10011<br>(214)222-1111 | ↻ PROCESSING | HTTPS://WWW.2FINDLOCAL.COM/B/<br>9317005/NEW-YORK-DOG-BOARDING-<br>JAN-B-NEW-YORK-NY | 05/17/2014<br>08:00PM ET |
| ⊙ | 2FINDLOCAL | ALFREDO PIZZA<br>2401 15TH ST<br>DENVER, CO 80202<br>(720)855-9407 | ✗ UNAVAILABLE (WHY?) | HTTPS://WWW.2FINDLOCAL.COM/B/<br>2499514/*****-NEW-YORK-NY | 04/30/2014<br>08:53PM ET |
| ⊙ | 2FINDLOCAL | ALFREDO PIZZA NEW<br>2107 E VIRGINIA AVE<br>SUITE 505, FLOOR 5<br>DENVER, CO 80209<br>(303)778-7740 | ↻ PROCESSING<br>CANCEL 👆 | HTTPS://WWW.2FINDLOCAL.COM/B/<br>9399444/THE-SOLITA-*****-HOTEL-AN<br>ASCEND-HOTEL-COLLECTION-<br>MEMBER-NEW-YORK-NY | 04/29/2014<br>07:14PM ET |
| ⊙ | 2FINDLOCAL | CAFÉ GRUMPY<br>224 WEST 20TH STREET<br>NEW YORK, NY 10011<br>(212)255-5511 | ✗ UNAVAILABLE (WHY?) | HTTPS://WWW.2FINDLOCAL.COM/B/<br>BLOG-CHEESE-PIZZA-15769 | 04/01/2014<br>02:23AM ET |
| ⊙ | 2FINDLOCAL | ALFREDO PIZZERIA<br>1550 CALIFORNIA ST.<br>DENVER, CO 80202<br>(303)573-6231 | ✓ SUPPRESSED<br>ADDITIONAL URL | HTTPS://WWW.2FINDLOCAL.COM/B/<br>BLOG-PIZZA-DELIVERY-11610 | 04/01/2014<br>02:20AM ET |

1305
THE SOURCE SYSTEM SELECTS A REPRESENTATIVE LISTING OF AN ENTITY LOCATED ON A PROVIDER SYSTEM, THE REPRESENTATIVE LISTING HAVING FIRST IDENTIFICATION DATA AND A FIRST PROVIDER-SUPPLIED EXTERNAL IDENTIFIER.

1310
THE SOURCE SYSTEM SEARCHES THE PROVIDER SYSTEM FOR ADDITIONAL LISTINGS HAVING IDENTIFICATION DATA MATCHING THE FIRST IDENTIFICATION DATA.

1315
THE SOURCE SYSTEM RECEIVES FROM THE PROVIDER SYSTEM A POTENTIAL MATCHING LISTING HAVING IDENTIFICATION DATA MATCHING THE FIRST IDENTIFICATION DATA AND HAVING A SECOND PROVIDER-SUPPLIED EXTERNAL IDENTIFIER THAT DIFFERS FROM THE FIRST PROVIDER-SUPPLIED EXTERNAL IDENTIFIER.

1320
THE SOURCE SYSTEM, DESIGNATES THE POTENTIAL MATCHING LISTING AS A DUPLICATE LISTING.

1325
THE SOURCE SYSTEM TRANSMITS TO THE PROVIDER SYSTEM A REQUEST TO SUPPRESS THE DESIGNATED DUPLICATE LISTING ON THE PROVIDER SYSTEM, THE REQUEST COMPRISING THE SECOND PROVIDER-SUPPLIED EXTERNAL IDENTIFIER.

1605
A SOURCE SYSTEM RECEIVES FROM AT LEAST ONE OF THE USER ASSOCIATED WITH AN ENTITY OR THE HUMAN OPERATOR ASSOCIATED WITH THE SOURCE SYSTEM, AN INDICATION TO SUPPRESS ALL LISTINGS ASSOCIATED WITH THE ENTITY ON ONE OR MORE PROVIDER SYSTEMS, WHEREIN THE INDICATION COMPRISES IDENTIFICATION DATA OF THE ENTITY AND AN INDICATION THAT THE IDENTIFICATION DATA OF THE ENTITY IS NO LONGER VALID.

1610
THE SOURCE SYSTEM RETRIEVING FROM A DATABASE ASSOCIATED WITH THE SOURCE SYSTEM A LIST OF ONE OR MORE PROVIDER SYSTEMS ASSOCIATED WITH THE SOURCE SYSTEM AND HAVING AT LEAST ONE LISTING CORRESPONDING TO THE ENTITY.

1615
FOR EACH PROVIDER SYSTEM IN THE LIST OF ONE OR MORE PROVIDER SYSTEMS: SEARCHES THE SOURCE SYSTEM SEARCHES THE PROVIDER SYSTEM FOR LISTINGS HAVING IDENTIFICATION DATA MATCHING THE IDENTIFICATION DATA OF THE ENTITY.

1620
THE SOURCE SYSTEM RECEIVES FROM THE PROVIDER SYSTEM ONE OR MORE MATCHING LISTINGS HAVING IDENTIFICATION DATA MATCHING THE IDENTIFICATION DATA OF THE ENTITY, WHEREIN EACH LISTING OF ONE OR MORE MATCHING LISTINGS HAS A CORRESPONDING PROVIDER-SUPPLIED EXTERNAL IDENTIFIER ASSIGNED BY THE PROVIDER SYSTEM.

1625
THE SOURCE SYSTEM TRANSMITS TO THE PROVIDER SYSTEM A REQUEST TO SUPPRESS THE ONE OR MORE MATCHING LISTINGS, THE REQUEST TO SUPPRESS THE ONE OR MORE MATCHING LISTINGS COMPRISING A LIST OF THE ONE OR MORE CORRESPONDING PROVIDER-SUPPLIED EXTERNAL IDENTIFIERS.

FIG. 16

SUPPRESSING DUPLICATE LISTINGS ON A SEARCH PROVIDER SYSTEM

CROSS-REFERENCE TO RELATED APPLICATIONS

This application is a continuation of U.S. patent application Ser. No. 17/351,956 filed on Jun. 18, 2021, which is a continuation of U.S. patent application Ser. No. 16/242,470 filed on Jan. 8, 2019 (issued as U.S. Pat. No. 11,074,263 on Jul. 27, 2021), which is a continuation of U.S. patent application Ser. No. 15/342,397 filed on Nov. 3, 2016 (issued as U.S. Pat. No. 10,216,807 on Feb. 26, 2019), which is a continuation of U.S. patent application Ser. No. 15/083,979 filed on Mar. 29, 2016 (issued as U.S. Pat. No. 9,519,721 on Dec. 13, 2016), which is a continuation of U.S. patent application Ser. No. 14/793,904 filed on Jul. 8, 2015 (issued as U.S. Pat. No. 9,361,388 on Jun. 7, 2016), which is a continuation of U.S. patent application Ser. No. 14/793,263 filed on Jul. 7, 2015 (issued as U.S. Pat. No. 9,443,025 on Sep. 13, 2016), the disclosures of which are incorporated herein by reference in their entireties.

TECHNICAL FIELD

The present invention relates generally to Internet search methods, and more particularly, to a method and system for selecting a single accurate listing and suppressing other duplicate listings on one or more listing provider systems from a single source system given that a publisher selects a different listing as a synchronized listing.

BACKGROUND

A consumer and/or merchant may rely heavily on services rendered via the Internet. One such service is searchable listings provided by a search service (hereinafter, a "search provider system," "provider system," "provider site," or simply, a "provider"). Examples of providers include "yellow pages" or "Internet yellow pages," e.g., Google.com, Amazon.com, Yahoo.com, Yelp.com, MapQuest.com, Superpages.com, etc. Searchable listings may be provided for an entity (e.g., an advertiser, a business, an organization, a government agency, etc., e.g., users of a provider system). Listings may include businesses, such as restaurants, people information, product information, etc. The information provided may include, for example, a name of a person or business, addresses, telephone numbers, web site URLs, photos, videos e-mail addresses, etc. A consumer may be presented with other information about a business by either clicking anywhere in the listing, or placing a mouse pointer or finger over a portion of the listing.

Certain search service providers, such as Google.com, WhitePages.com, MapQuest.com, provide some or all of the requested information in alphabetical, "most visited," or distance order (e.g., distance from a location that the consumer entered for a search or a distance from a location of the search provider). A merchant may wish to ensure that information provided in the search results is correct, so that a consumer may find a listing when searching in her local area, and if the consumer does choose to call or visit a business, the consumer is provided with correct information. Furthermore, a merchant may desire to maximize the chance that a consumer will select a listing of the merchant from among those returned. The listing may be displayed higher in the search results and/or be featured in a more prominent and attractive fashion. The ordering of the listings is sometimes influenced by the extent to which content is available for the listing. Further still, the merchant may desire to maximize the probability that a consumer that views additional information about a business will have a favorable impression of the business.

The above goals may be achieved by maximizing the presence and quality of content associated with a listing. The merchant associated with a listing may desire to be listed with multiple search services. Unfortunately, there is no one central database that contains listings of locations of all businesses from which providers may source their listings. Frequently, a business location of a merchant may be represented multiple times on a provider site (i.e., duplicate listings). FIG. 1 shows one example of a screen shot illustrating duplicate listings for a location of a business. Consumers are increasingly relying on mobile applications, more personalized recommendation sites (e.g., Yelp, Foursquare, Facebook, etc.) or more vertical-specific sites (e.g., TripAdvisor, OpenTable, etc.) to discover locations of businesses. If the consumer encounters duplicate listings with incorrect data, the consumer may become confused and frustrated. The consumer may choose to ignore the listings in their entirety, leading to lost business for merchants who have duplicate listings.

A search service provider may combine local business listings from a variety of data sources (e.g., yellow pages publishers and data aggregators). If a business location is not consistently represented across the data sources, or is represented multiple times, then the location of the business may not rank highly in search page results for certain search terms input by a consumer. As a way to obtain revenue, many search provider web sites permit a merchant to respond to consumer reviews with respect to business listings of the merchant. If a business location associated with a merchant is represented multiple times on a provider site, then it may become difficult for the merchant to respond to consumer reviews across multiple listings of one location of a business of the merchant.

Duplicate listings for one location of a business may be created in many ways. Duplicate listings may be created by merchants, by consumers, by sources that providers use to build their location databases, by the providers themselves, and/or by common crawling practices that providers may employ to build their location databases.

Duplicate listings may be created by employees of a business when multiple employees of the business independently create a listing for the same location of the business on a provider web site. This may happen when the business does not have a cohesive location strategy, as may occur in a large company with many locations.

Consumers may create duplicate listings when a provider crowd-sources their location database. On such provider web sites (e.g., Facebook, Foursquare, Yelp, etc.), consumers are able to create new representations of physical locations. For example, a consumer can create a new listing prior to viewing it on Foursquare, Yelp, or Facebook. For several reasons, multiple consumers may create duplicate listings for the same location on the provider web site.

Search providers often obtain location information for business listings from business listing aggregators, which are companies that gather information from a variety of sources to determine a name, address, phone number(s), etc., of a business. Business listing aggregators may license the obtained business listing information to other search providers. Unfortunately, business listing aggregators are often not accurate with respect to matching records from various sources, and during the matching process, more duplicates may be created (and thus causing duplicates downstream at the provider level).

At the provider level, providers typically combine various sources (from merchants, consumers, and aggregators) into one consolidated location database. Unfortunately, providers may not have accurate matching and data cleanup processes, leading to the creation of duplicate listings.

Frequently, aggregators and providers crawl the Web to obtain location information. However, due to the imperfect information on the Web, an aggregator and a provider may cross-contaminate each other's location databases. For example, an aggregator may inadvertently transmit duplicate listings to a provider, and subsequently the aggregator fixes the duplicate problem. However, because both the aggregator and the provider rely on web-crawling as a source of information, and the provider may have obtained duplicate information by web-crawling the web site of the aggregator before the aggregator has removed the duplicate information, duplicate listings may re-occur on the web sites of both the aggregator and the provider. The cycle continues!

SUMMARY

As used herein, the term "listing identification data" may refer to one or more of the following three types of content employed by examples of the present disclosure to identify or define a location of an entity (e.g., a business, organization, government agency, etc.): (a) "basic content", e.g., a name, street address, and telephone number associated with the location of the entity (e.g., a business, organization, government agency, etc.); (b) "enhanced static content," e.g., content that does not change frequently and is often cached (e.g., a web site universal resource locator (URL), a business description, business hours, e-mail addresses, photos, videos, etc.); and (3) "enhanced real-time content", e.g., content that changes frequently and needs to be served to a user in real-time (e.g., structured lists and featured messages, etc.). Enhanced real-time content may also include a "structured list". A structured list refers to a type of enhanced content, e.g., lists of formatted real-world information that follows a distinct, easily recognizable pattern. Examples of structured listings may include, but are not limited to, restaurant menu lists, biographies of employees ("bios"), lists of products and services, lists of events, etc. In an example, a listing may include at least basic content and enhanced static content and/or enhanced real-time content (together an "enhanced listing").

The above-described problems are addressed and a technical solution is achieved in the art by providing a method and system for suppressing a duplicate listing given a known representative (synchronized) listing on a provider system from a source system. The source system may select a representative listing of an entity (e.g., a business, an organization, a government agency, etc.) located on a provider system. The representative listing may comprise first identification data and a first provider-supplied external identifier. Accordingly, the source system may search the provider system for additional listings having identification data matching the first identification data. The source system may receive from the provider system a potential matching listing having identification data matching the first identification data and having a second provider-supplied external identifier that differs from the first provider-supplied external identifier. The source system may designate the potential matching listing as a duplicate listing. The source system may transmit a request to the provider system to suppress the designated duplicate listing on the provider system. The request may comprise the second provider-supplied external identifier.

In an example, responsive to the source system receiving an acknowledgement from the provider system that the provider system has accepted the request to suppress the designated duplicate listing in view of the second provider-supplied external identifier, the source system may receive from the provider system a confirmation that the provider system has suppressed the designated duplicate listing.

In an example, in response to the source system receiving from the provider system the confirmation that the provider system has suppressed the designated duplicate listing, the source system may verify that the designated duplicate listing has been suppressed on the provider system. In one example, verifying that the designated duplicate listing has been suppressed on the provider system may comprise the source system visiting the address provided by a universal resource locator (URL) associated with the designated duplicate listing on the provider system. In another example, verifying that the designated duplicate listing has been suppressed on the provider system may comprise the source system employing an application programming interface (API) to search the provider system for the designated duplicate listing.

In an example, the source system may receive from the provider system an indication from the provider system that the designated duplicate listing no longer exists on the provider system. In one example, the indication may be a listing not found response. In another example, the source system may receive from the provider system a universal resource locator redirected response comprising a universal resource locator associated with representative listing. In another example, the indication may comprise the source system receiving from the provider system a list of entries. The provider system may determine that the list of entries does not contain the designated duplicate listing.

In an example, the source system may receive from the provider system a receipt file as a confirmation that the provider system has suppressed the designated duplicate listing. The receipt file may comprise a record corresponding to the designated duplicate listing, the record comprising the second provider-supplied external identifier, a universal resource locator associated with the designated duplicate listing, and an indication that the designated duplicate listing is not in service on the provider system.

The above-described problems are addressed and a technical solution is achieved in the art by providing a method and system for suppressing a duplicate listing by first determining a representative (synchronized) listing on a provider system from a source system and then designating any other corresponding listings for a location as duplicate listings. The source system may receive from a user associated with an entity initial identification data of a listing related to the entity (e.g., a business, an organization, a government agency, etc.). The source system may search a provider system for one or more listings having identification data matching the initial identification data. The source system may receive from the provider system a plurality of potential matching listings having identification data matching the initial identification data. Each listing of the plurality of potential matching listings may have a corresponding confidence score assigned by the source system. Each listing of the plurality of potential matching listings may have a corresponding provider-supplied external identifier assigned by the provider system. The source system may designate a representative listing of the entity located on a provider system from among the plurality of potential matching listings. The representative listing may be the listing having the highest confidence score assigned by the source system. The source system may designate the remaining one or more potential matching listings of the plurality of potential matching listings as one or more duplicate listings. The source system may transmit to the provider system a request to synchronize the representative listing having the highest confidence score assigned by the source system as the representative listing of the entity on the provider system. The request may comprise a first provider-supplied external identifier.

Responsive to the source system receiving a confirmation from the provider system that the provider system has synchronized the representative listing having the highest confidence score assigned by the source system as the representative listing of the entity on the provider system, the response comprising the first provider-supplied external identifier, the source system may transmit to the provider system a request to suppress the remaining one or more potential matching listings as one or more duplicate listings. The request to suppress the remaining one or more potential matching listings may comprise the remaining one or more provider-supplied external identifiers.

In one example, before transmitting the request to suppress the remaining one or more potential matching listings, the source system may verify that a plurality of fields associated with the confirmed representative listing are correct.

In an example, before the request to suppress the remaining one or more potential matching listings, the source system may update in the database associated with the source system, a record associated with the listing having the highest confidence score with an indication that the listing having the highest confidence score is the representative listing of the entity located on a provider system. The indication may comprise the first provider-supplied external identifier.

In an example, the request to synchronize the representative listing having the highest confidence score may be transmitted by the source system to the provider system using an application programming interface. An acknowledgement to accept the request to synchronize the representative listing having the highest confidence score may be received by the source system from the provider system using an application programming interface. The confirmation that the provider system has synchronized the representative listing may be received by the source system from the provider system using the application programming interface.

In an example, the request to synchronize the representative listing having the highest confidence score may be transmitted by the source system to the provider system using a first feed. An acknowledgement to accept the request to synchronize the representative listing having the highest confidence score may be received by the source system from the provider system using the first feed. The confirmation that the provider system has synchronized the representative listing may be received by the source system from the provider system using a second feed.

In an example, responsive to the source system receiving an acknowledgement from the provider system that the provider system has accepted the request to suppress the remaining one or more potential matching listings as one or more duplicate listings, the source system may receive from the provider system at least one confirmation that the provider system has suppressed the remaining one or more potential matching listings as one or more duplicate listings. The at least one confirmation may comprise the corresponding remaining one or more provider-supplied external identifiers.

In one example, responsive to the source system receiving from the provider the at least one confirmation that the provider system has suppressed the remaining one or more potential matching listings as one or more designated duplicate listings, the source system may verify on the provider system that the one or more designated duplicate listings have been suppressed on the provider system. In one example, the source system verifying that the remaining one or more potential matching listings have been suppressed on the provider system may comprise, after transmitting the request to suppress the remaining one or more potential matching listings, transmitting to the provider system the corresponding remaining one or more provider-supplied external identifiers.

In one example, verifying may comprise visiting, by the source system on the provider system, the corresponding one or more universal resource locators (URL) associated with the one or more designated duplicate listings. In one example, verifying may comprise the source system employing an application programming interface (API) to search the provider system for the one or more designated duplicate listings.

In one example, verifying may comprise the source system receiving one or more corresponding indications from the provider system that the one or more designated duplicate listings no longer exist on the provider system. The one or more corresponding indications may be one or more listing not found responses. In an example, verifying may comprise the source system receiving from the provider system one or more corresponding universal resource locator redirected responses comprising one or more universal resource locators associated with representative listing. In one example, verifying may comprise the source system receiving from the provider system a list of entries corresponding to a search results page. The source system may determine that the list of entries does not contain the one or more remaining listings.

In one example, the source system may assign a confidence score to a potential matching listing. The confidence score may be based the one or more fields of the identification data associated with the potential matching listing. In one example, responsive to the source system assigning the confidence score to the potential matching listing equal to or above a first threshold value, the source system may mark the potential matching listing as a confirmed matching listing. The source system may perform the designation of the potential matching listing as the duplicate listing. In one example, responsive to the source system assigning the confidence score to the potential matching listing lower than a second threshold value below the threshold first value, the source system may discard for further consideration the potential matching listing as non-matching listing. In one example, responsive to the source system assigning the confidence score to the potential matching listing equal to or above a second threshold value below the first threshold value, the source system may mark the potential matching listing as a probable matching listing.

In one example, responsive to the source system designating the potential matching listing as probable matching listing, the source system may present the probable matching listing to at least one of a user associated with the entity (e.g., the merchant) or a human operator associated with the source system. The source system may receive from the at least one of the user associated with the entity (e.g., the merchant) or the human operator associated with the source system, a designation of the probable matching listing as a non-matching listing. The source system may mark in the database associated with the source system, a record associated with the potential matching listing with an indication that the potential matching listing is a non-matching listing. The source system may be operable to remove the non-matching listing from future consideration in searches for duplicate listings.

In one example, the source system may receive from at least one of the user associated with the entity (e.g., the merchant) or the human operator associated with the source system, a designation of the probable matching listing as a confirmed matching listing. The source system may mark in the database associated with the source system, the record associated with the potential matching listing with an indication that the potential matching listing is a confirmed matching listing. The source system may perform the designation of the potential matching listing as the duplicate listing.

The above-described problems are addressed and a technical solution is achieved in the art by providing a method and system for suppressing a duplicate listing by first determining a representative (synchronized) listing on a provider system and designating any other corresponding listings for a location as duplicate listings, but the provider system selects a different listing as the synchronized listing rather than the one selected by the source system. The source system may receive initial identification data of a listing related to an entity. The source system may search a provider system for one or more listings having identification data matching the initial identification data. The source system may receive from the provider system a plurality of potential matching listings having identification data matching the initial identification data. Each listing of the plurality of potential matching listings may have a corresponding confidence score assigned by the source system. Each listing of the plurality of potential matching listings may have a corresponding provider-supplied external identifier assigned by the provider system. The source system may designate a representative listing of the entity located on a provider system from among the plurality of potential matching listings. The representative listing may be the listing having the highest confidence score assigned by the source system. The source system may transmit to the provider system a request to synchronize the representative listing having the highest confidence score assigned by the source system as the representative listing of the entity on the provider system. The request may comprise a first provider-supplied external identifier. The source system may receive from the provider system an indication that a second listing of the plurality of potential matching listings has been selected by the provider system as the representative listing of the entity on the provider system. The response may comprise a second provider-supplied external identifier. The source system may re-designate the second listing as the representative listing of the entity on the provider system and may designate the remaining one or more remaining listing of the plurality of potential matching listings as one or more duplicate listings on the provider system. The source system may transmit to the provider system a request to suppress the remaining one or more listings as one or more duplicate listings. The request to suppress the remaining one or more listings may comprise one or more third provider-supplied external identifiers.

In an example, responsive to the source system receiving an acknowledgement from the provider system that the provider system has accepted the request to suppress the one or more remaining listings as one or more duplicate listings, the source system may receive from the provider system at least one confirmation that the provider has suppressed the one or more remaining listings as one or more duplicate listings, the at least one confirmation comprising the corresponding remaining one or more third provider-supplied external identifiers.

In an example, responsive to the source system receiving from the provider system, the at least one confirmation that the provider system has suppressed the remaining one or more potential matching listings as one or more designated duplicate listings, the source system may verify on the provider system that the one or more designated duplicate listings have been suppressed on the provider system. In an example, responsive to the source system receiving from the provider system the confirmation that the provider system has suppressed the one or more remaining listings as one or more duplicate listings, the source system may verify on the provider system that the one or more remaining listings as one or more duplicate listings have been suppressed on the provider system.

In one example, verifying that the one or more remaining listings as one or more duplicate listings have been suppressed on the provider system may comprise, after the source system transmits the request to suppress the one or more remaining listings as one or more duplicate listings, the source system may transmit to the provider system the corresponding one or more third provider-supplied external identifiers.

In one example, verifying that the one or more remaining listings as one or more duplicate listings have been suppressed on the provider system may comprise visiting, by the source system on the provider system, the corresponding one or more universal resource locators (URL) associated with the one or more remaining listings. In one example, verifying may comprise the source system receiving one or more corresponding indications from the provider system that the one or more remaining listings no longer exist on the provider system.

In one example, the one or more corresponding indications may be one or more listing not found responses.

In one example, verifying may comprise receiving, by the source system from the provider system, one or more corresponding universal resource locator redirected responses comprising one or more universal resource locators associated with the representative listing. In one example, verifying may comprise receiving, by the source system from the provider system, a list of entries corresponding to a search results page. The source system may determine that the list of entries does not contain the one or more remaining listings.

The above-described problems are addressed and a technical solution is achieved in the art by providing a method and system for suppressing a duplicate listing in response to a human triggering a suppression of a list of no longer valid listings on a plurality of provider systems. The source system may receive from at least one of the users associated with an entity (e.g., the merchant) or the human operator associated with the source system, an indication to suppress all listings associated with the entity on one or more provider systems. The indication may comprise identification data of the entity and an indication that the identification data of the entity is no longer valid. The source system may retrieve from a database associated with the source system, a list of one or more provider systems associated with the source system and having at least one listing corresponding to the entity.

For each provider system in the list of one or more provider systems: the source system may search the provider system for listings having identification data matching the identification data of the entity. The source system may receive from the provider system, one or more matching listings having identification data matching the identification data of the entity. Each listing of the one or more matching listings may have a corresponding provider-supplied external identifier assigned by the provider system. The source system may transmit to the provider system a request to suppress the one or more matching listings on the provider system. The request to suppress the one or more matching listings may comprise a list of the one or more corresponding provider-supplied external identifiers.

In an example, responsive to the source system receiving an acknowledgement from the provider system that the provider system has accepted the request to suppress the one or more matching listings in view of the one or more corresponding provider-supplied external identifiers, the source system may receive from the provider system a confirmation that the provider system has suppressed the one or more matching listings.

In an example, responsive to the source system receiving from the provider the confirmation that the provider system has suppressed the remaining one or more potential matching listings as one or more designated duplicate listings, the source system may verify on the provider system that the one or more designated duplicate listings have been suppressed on the provider system. In an example, verifying that the one or more designated duplicate listings have been suppressed on the provider system may comprise, after the source system transmits the request to the provider system to suppress the one or more matching listings, the source system may transmit to the provider system the list of the one or more corresponding provider-supplied external identifiers. In one example, verifying that the one or more designated duplicate listings have been suppressed on the provider system may comprise the source system visiting on the provider system, the one or more universal resource locators (URL) associated with the one or more matching listings. In one example, verifying that the one or more designated duplicate listings have been suppressed on the provider system may comprise employing, by the source system, an application programming interface (API) to search the provider system for the one or more matching listings. In an example, verifying that the one or more designated duplicate listings have been suppressed on the provider system may comprise the source system receiving an indication from the provider system that the one or more matching listings no longer exist on the provider system.

In an example, the indication may be one or more listing not found responses. In one example, verifying that the one or more designated duplicate listings have been suppressed on the provider system may comprise the source system receiving from the provider system a search results page. The source system may determine that the search results page does not contain the one or more matching listings.

In an example, the source system receiving a confirmation that the provider system has suppressed the one or more matching listings may comprise receiving a receipt file. The receipt file comprises one or more records corresponding to the one or more matching listings. Each record of the one or more records may comprise a provider-supplied external identifier associated a corresponding matching listing, a universal resource locator associated with the corresponding matching listing, and an indication that the corresponding matching listing is not in service on the provider system.

In one example, the source system may receive from the at least one of the users associated with an entity (e.g., the merchant) or the human operator associated with the source system, identification data of a replacement entity for delivery of an enhanced listing to a plurality of provider systems. For each provider system of the plurality of provider systems: the source system may transmit to the provider system identification data of the replacement entity and the enhanced listing to the provider system without a provider-supplied external identifier as an indication to the provider system to create a listing using the enhanced content.

The above-described problems are addressed and a technical solution is achieved in the art by providing a method and system for suppressing a duplicate listing on a plurality of provider systems. The source system may receive from a user associated with an entity (e.g., a merchant), an indication that a listing related to an entity is a duplicate listing of the entity on a provider system. The source system may search the provider system for the listing, the listing having identification data. The source system may receive from the provider system the listing having the identification data. The listing may not be marked by the source system as a representative listing of the entity located on a provider system, nor be marked by the source system as a duplicate listing of the representative listing for other entities. The source system may designate the listing as a probable matching listing of the entity on the provider system. The source system may transmit to a human operator associated with the source system, the probable matching listing for review.

In one example, the human operator may employ the source system to search the provider system for the probable matching listing. The human operator associated with the source system may receive an indication that the probable matching listing does not exist on the provider system. The source system may receive from the human operator associated with the source system, an indication of a rejection of the probable matching listing as the listing of the entity on the provider system. The source system may transmit to the user associated with an entity (e.g., the merchant) the indication of the rejection.

In one example, the human operator associated with the source system may search the database associated with the provider system for the probable matching listing. The human operator associated with the source system may receive from the source system, an indication that the probable matching listing exists on the provider system. The probable matching listing may be marked on the provider system as a representative listing or a duplicate listing associated with another entity on the provider system. The source system may receive from the human operator associated with the source system, an indication of a rejection of the probable matching listing as the listing of the entity on a provider system. The source system may transmit to the user associated with an entity (e.g., the merchant), the indication of the rejection.

In one example, the human operator associated with the source system may search the provider system for the probable matching listing. The human operator associated with the source system may receive from the source system, an indication that the probable matching listing exists on the provider system. The probable matching listing may be neither marked on the provider system as a representative listing nor be marked as duplicate listing associated with another entity on the provider system. The source system may receive from the human operator associated with the source system, an indication of a rejection of the probable matching listing as the listing of the entity on a provider system. The source system may transmit to the user associated with an entity (e.g., the merchant), the indication of the rejection.

The above-described problems are addressed and a technical solution is achieved in the art by providing a method and system for suppressing a duplicate listing on a plurality of provider systems. The source system may receive from a user associated with an entity (e.g., the merchant), a listing no longer associated with an entity on a provider system. The source system may search the provider system for the listing, the listing having identification data. The source system may receive from the provider system, the listing having the identification data. The listing may not be marked by the source system as a representative listing of the entity located on a provider system nor marked by the source system as a duplicate listing of the representative listing for other entities. The source system may designate the listing as a probable matching listing of the entity on the provider system. The source system may transmit to a human operator associated with the source system, the probable matching listing for review.

In one example, the human operator associated with the source system may employ the source system to search the provider system for the probable matching listing. The human operator associated with the source system may receive an indication that the probable matching listing does not exist on the provider system. The source system may receive from the human operator associated with the source system, an indication of a rejection of the probable matching listing as the listing of the entity on the provider system. The source system may transmit to the user associated with an entity (e.g., the merchant), the indication of the rejection.

In one example, the human operator associated with the source system may employ the source system to search the provider system for the probable matching listing. The human operator associated with the source system may receive an indication that the probable matching listing exists on the provider system. The probable matching listing may be marked on the provider system as a representative listing or a duplicate listing associated with another entity on the provider system. The source system may receive from the human operator associated with the source system, an indication of a rejection of the probable matching listing as the listing of the entity on a provider system. The source system may transmit to the user associated with an entity (e.g., the merchant), the indication of the rejection.

In an example, the human operator associated with the source system may employ the source system to search the provider system for the probable matching listing. The human operator associated with the source system may receive an indication that the probable matching listing exists on the provider system. The probable matching listing may neither be marked on the provider system as a representative listing, nor be marked as duplicate listing associated with another entity on the provider system. The source system may receive from the human operator associated with the source system an indication of a rejection of the probable matching listing as the listing of the entity on a provider system. The source system may transmit to the user associated with an entity (e.g., the merchant) the indication of the rejection.

BRIEF DESCRIPTION OF THE DRAWINGS

The present invention may be more readily understood from the detailed description of examples presented below considered in conjunction with the attached drawings and in which like reference numerals refer to similar elements.

Figure 1:
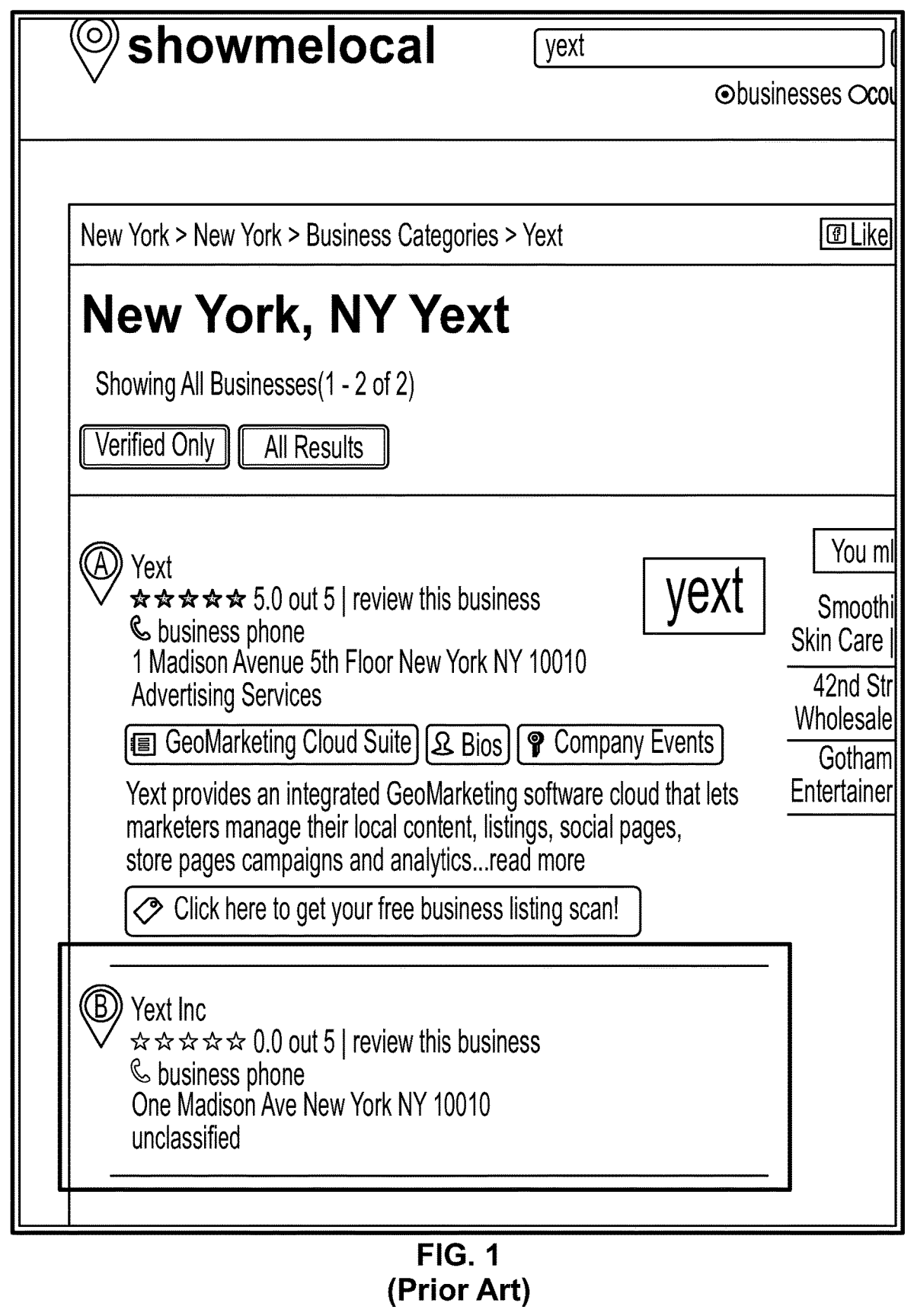

FIG. 1 shows one example of a screen shot illustrating duplicate listings for a location of a business.

FIGS. 2A and 2B are screen shots of enhanced listings.

FIGS. 7A-7C show an example of a list of all of the listings that should be enhanced listings, as provided by the source system to the provider system.

FIG. 8 shows an example of a receipt file containing the listings of FIGS. 7A and 7B.

FIG. 10 shows a screen shot for a source system removing duplicate lists associate with a location of a business.

FIG. 11 shows a screen shot of a search results page provided to the merchant or a human review operator.

FIG. 13 is a flow diagram illustrating an example of a method for suppressing a duplicate listing given a known representative (synchronized) listing on a provider system from a source system.

FIG. 16 is a flow diagram illustrating an example of a method for suppressing a duplicate listing in response to a human triggering a suppression of a list of no longer valid listings on a plurality of provider systems.

Figure 2A:
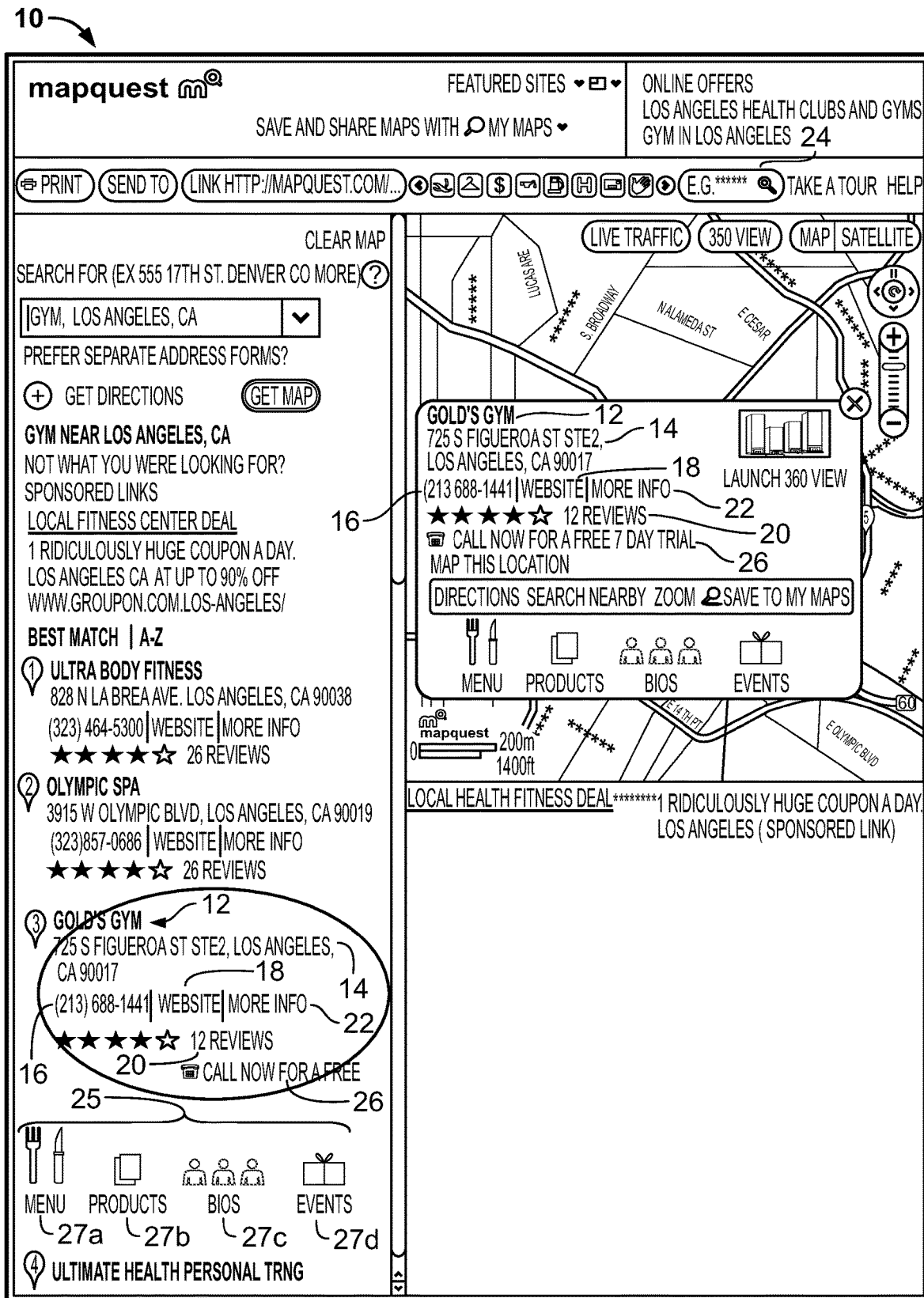

It is to be understood that the attached drawings are for purposes of illustrating the concepts of the invention and may not be to scale.

DETAILED DESCRIPTION

In examples of the present disclosure, merchants may have their business listed in the so-called "organic search results" on a large number of directories (including Web sites, mobile apps, etc.) through a single product/system with little or no duplicate listing are provided. As used herein, the term "organic search results" refers to, but is not limited to, listings on search engine results pages that appear because of their relevance to the search terms, as opposed to their being advertisements. In contrast, non-organic search results may include pay per click advertising.

A merchant is permitted to list promotional material comprising enhanced content associated with a listing through, among other things, highlighted content in search results and more complete content in the business profile on the service provider. In some embodiments, a universal resource locator (URL) is provided to permit the merchant to see their promoted listing on each search service provider's Web site. The merchant is permitted to update their information (e.g., when they move or when their phone number changes) and enhance their listing (e.g., by adding or modifying photos, text descriptions, special offers, hours, menus, bios, products and services, events, etc., i.e., enhanced content) from a single point substantially in real-time or near real-time.

The term "computer" or "computer platform" is intended to include any data processing device, such as a desktop computer, a laptop computer, a tablet computer, a mainframe computer, a server, a handheld device, a digital signal processor (DSP), an embedded processor (an example of which is described in connection with FIG. 19 hereinbelow), or any other device able to process data. The computer/computer platform is configured to include one or more microprocessors communicatively connected to one or more non-transitory computer-readable media and one or more networks. The term "communicatively connected" is intended to include any type of connection, whether wired or wireless, in which data may be communicated. The term "communicatively connected" is intended to include, but not limited to, a connection between devices and/or programs within a single computer or between devices and/or separate computers over a network. The term "network" is intended to include, but not limited to, OTA (over-the-air transmission, ATSC, DVB-T), packet-switched networks (TCP/IP, e.g., the Internet), satellite (microwave, MPEG transport stream or IP), direct broadcast satellite, analog cable transmission systems (RF), and digital video transmission systems (ATSC, HD-SDI, HDMI, DVI, VGA), etc.

The one or more computer readable media may be used for storing the instructions to be executed by the one or more processors, including an optional operating system, such as the Windows or the Linux operating system. The computer readable media may further be used for the storing and retrieval of data in one or more databases. The computer readable media may include a combination of volatile memory, such as RAM memory, and non-volatile memory, such as flash memory, optical disk(s), and/or hard disk(s). Portions of the data stored in the computer readable media may be provided by one or more human users at one or more monitors. The monitor (s) may be equipped with a keyboard and a mouse for selecting objects of interest by the user or for inputting data.

Figure 2B:
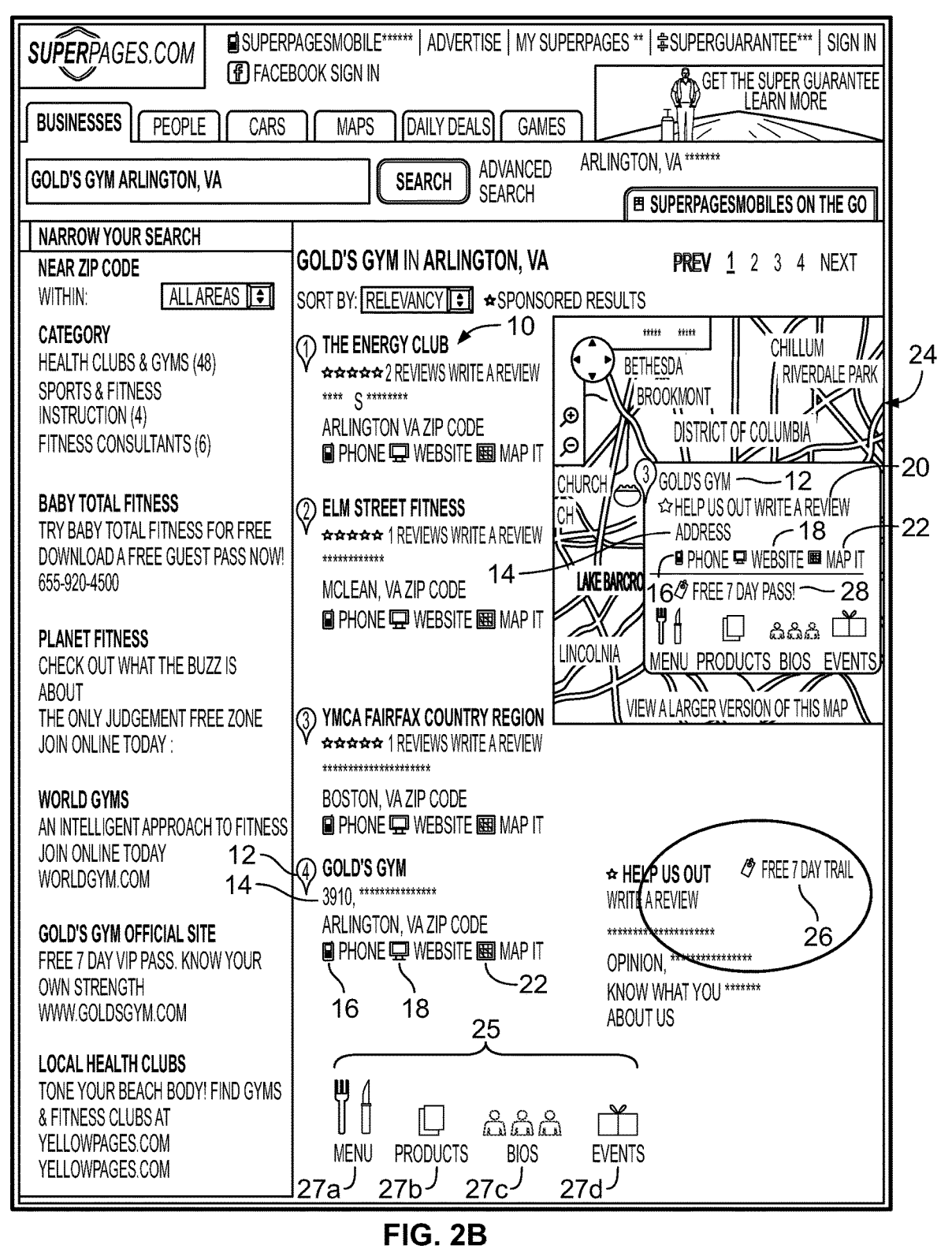

FIGS. 2A and 2B are screen shots of enhanced listings. The listings 10 (e.g., Gold's Gym) may include, but are not limited to, a business name 12, address 14, telephone number 16, a link to a website for the business 18, user review information 20, a pointer to a map 22 of the location of the business, the business location on a map 24, a promotional message 26, and a list of structured listings 25, which may include, but are not limited to, menus 27a, bios 27b, products and services 27c, events 27d, etc.

Figure 3A:
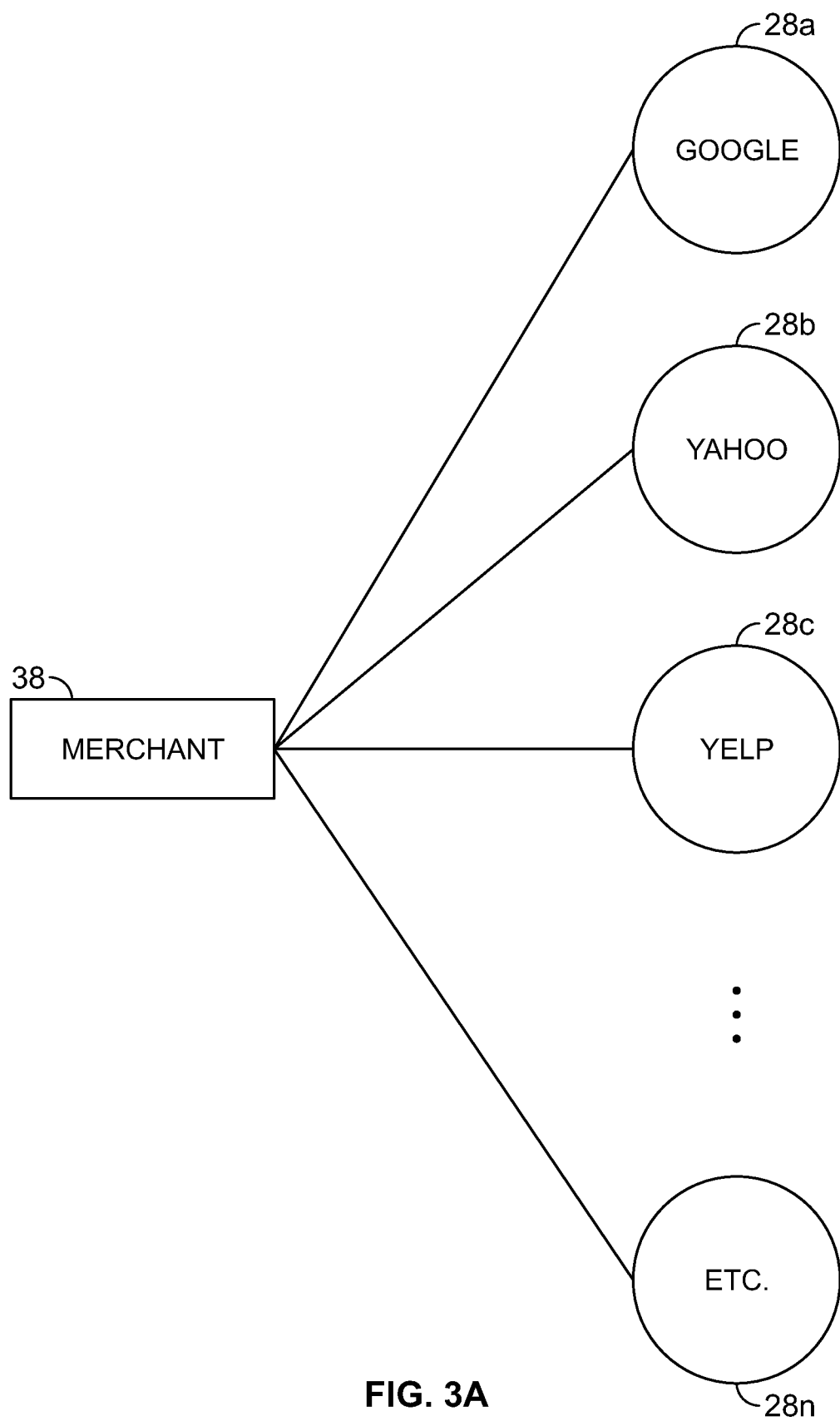
FIG. 3A depicts a high level architecture managing listings on multiple search service providers.
Figure 3B:
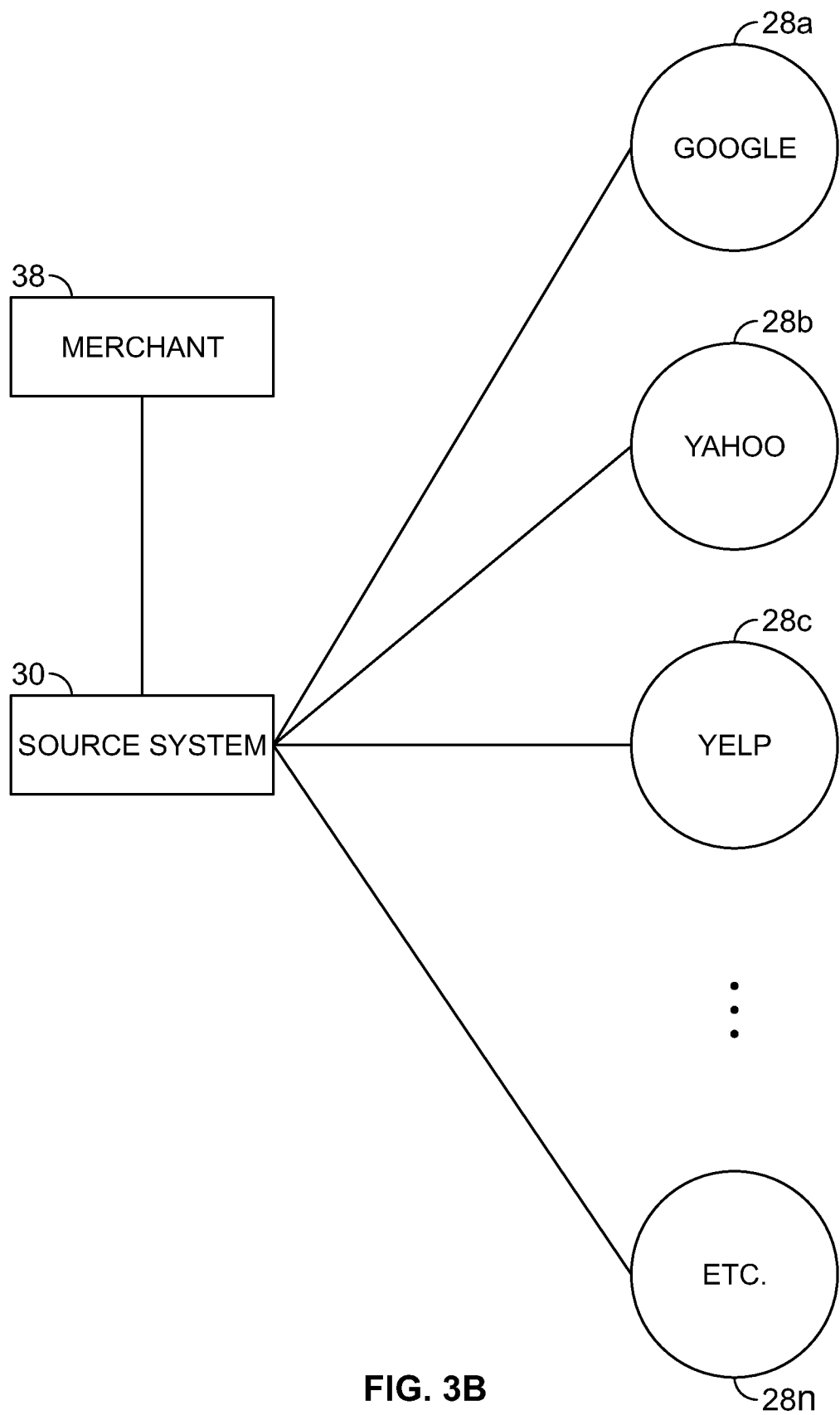
FIG. 3B depicts a high level system architecture for managing enhanced listings on multiple search service providers from a single source system, according to examples of the present disclosure.

FIG. 3A depicts a conventional high level architecture managing listings on multiple search service providers 28a-28n. As described hereinabove, the merchant 38 that desires to enter a listing or correct an existing listing needs to do so with each of the search service providers 28a-28n (e.g., Google, Yahoo, Yelp, etc.) directly and separately, thereby needlessly duplicating effort that is substantially prone to errors accumulated over time, particularly the creation of duplicate listing as described hereinabove. FIG. 3B depicts a high level system architecture for managing enhanced listings on multiple search service providers 28a-28n from a single source system 30, according to examples of the present disclosure. In contrast to the architecture of FIG. 2A, in FIG. 2B, the merchant 38 needs only to access the single source system 30 for entering a common listing that is propagated from the single source system 30 in real or near-real time to the search service providers 28a-28n. The single source system 30 may be employed to suppress duplicate listings when and where they may arise.

Figure 4:
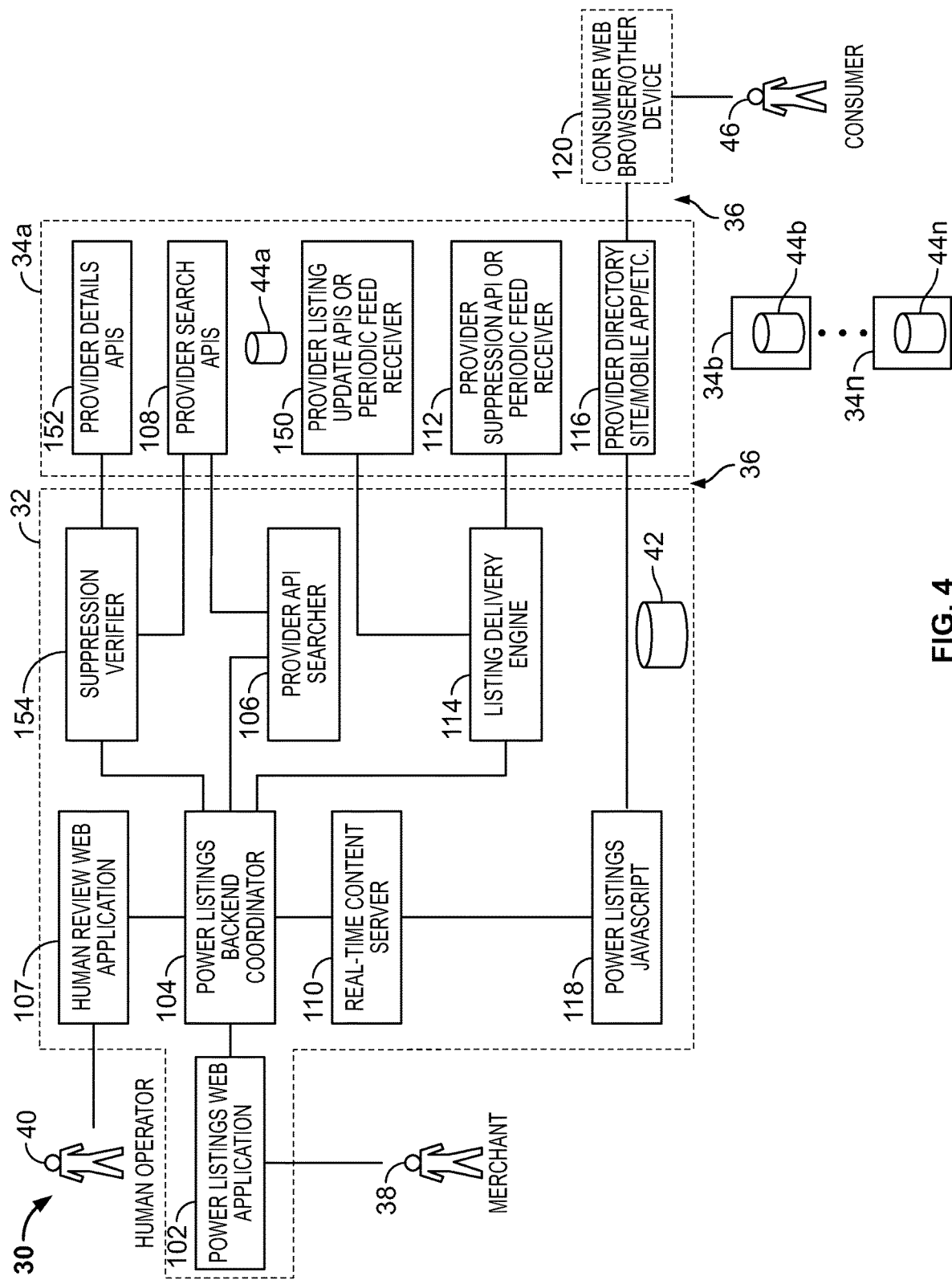
FIG. 4 depicts a system architecture of a single source system for providing enhanced listings to multiple search service providers and for suppressing duplicate listings on web sites associated with the multiple search service providers.

FIG. 4 depicts a system architecture of a single source system 30 for providing enhanced listings to multiple search service providers 34a-34n and for suppressing duplicate listings on web sites associated with the multiple search service providers 34a-34n. The system may be executed on one or more computer platforms 32, 34a-34n, interconnected by one or more networks 36, which may include the Internet. A central computer platform 32 (hereinafter "the source system 32") include a plurality of software modules 102, 104, 106, 107, 110, 114, 118, 154 that are communicatively connected with a merchant 38, one or more human operators a plurality of service provider computer platforms 34a-34n (hereinafter "the provider system(s) 34a-34n"), and a system database 42. Each of the service provider computer platforms 34a-34n provides a plurality of modules 108, 112, 116, 150, 152 with which the source system 32 interacts for carrying out operations and providing result data between the source system 32 and the service provider computer platforms 34a-34n.

A plurality of provider search application programming interfaces (APIs) 108 may permit the source system 32 to search for matching listings as part of a matching process. The provider API searcher 106 may be configured to accommodate existing provider search APIs 108 provided that an existing provider search API 108 meets system standards. In certain circumstances, a provider system (e.g., 34a) may need to modify their search provider API 108 so that it may operate properly with the source system 32. The provider listing update APIs 150 may be configured to receive information about new and updated listings to display from the listing delivery engine 114. Should a provider system (e.g., 34a) be unable to supply a provider listing update API 150, the provider system (e.g., 34a) may supply a periodic feed receiver 112 for processing periodic data updates generated by the source system 32 containing listings that should contain enhanced content. These are modules designed by each of the provider system (e.g., 34a). They are designed to accommodate a source system enhanced listings format. The provider directory site/mobile app/etc. 116 is a module that serves the directory sites with which a consumer 46 interacts, e.g., MapQuest.com, the MapQuest iPhone app, etc.

The modules 108, 112, 116, 150, 152 are, in turn, communicatively connected to a plurality of user devices running some form of communication software, preferably in a consumer Web browser 120 over a network, such as the Internet 36, and a provider database 44a-44n. In an example, the computer platform 32 may be communicatively connected to each of the plurality of user devices via a Power-Listings JavaScript 118 running in the consumer Web browser 120 when enhanced content is pulled directly from a consumer Web browser 120 or device, rather than passing through a provider system (e.g., 34a). In such circumstances, the PowerListings JavaScript 118 (either provided by the system provider or written by the provider system (e.g., 34a) and included within a Web page) may be configured to call the real-time content server 110 and obtain the needed enhanced content. Alternatively, the PowerListings JavaScript 118 may be replaced with, for example, a mobile application or some other non-Web application. In such circumstances, the mobile or external application may communicate directly with the real-time content server 110 to obtain the real-time content updates. However, in an example, a request typically passes through a provider system (e.g., 34a) rather than having a direct connection between the application running on the consumer's device and the real-time content server 110.

In an example, the PowerListings Web application 102 may receive listing identification data provided by the merchant 38 associated with a business of a merchant 38 and an identification of a provider system (e.g., 34a) from the merchant 38. The listing identification data provided by the merchant 38, may include, but is not limited to, a business name, street address, and telephone number. The power listings backend coordinator 104 may transmit a message to a provider API searcher 106 to attempt to find one or more listings matching the received listing identification data to listing data that may be located in the provider database (e.g., 008a) associated with the provider system (e.g., 34a). The provider API searcher 106 may invoke a provider API 108 with the listing identification data supplied by the merchant 38. The provider API 108 of the provider system 34a may return potential matching listings to the provider API searcher 106. The provider API searcher 106 may return potential matching listings to the power listings backend coordinator 104. The power listings backend coordinator 104 may employ a method to determine which of the returned results matches the listing identification data supplied by the merchant 38, if any, and a measure of confidence of a match for the provider system (e.g., 34a).

A set of representations of listings associated with a merchant 38 (hereinafter "potential matching listings") may be returned by the provider search API (108). Each listing of the plurality of potential matching listings may have a corresponding external provider-supplied identifier (or provider-supplied identifier) associated with the provider system (e.g., 34a). The power listings backend coordinator 104 may be configured to categorize the potential matching listings into three categories based on a confidence score assigned by the power listings backend coordinator 104: a confirmed matching listing, a probable matching listing, or a non-matching listing.

In an example, if the confidence score assigned to the potential matching listing is above or equal to a first level of confidence, the power listings backend coordinator 104 may categorize the potential matching listing as a confirmed matching listing. If the confidence score assigned to the potential matching listing is above or equal to a second level of confidence below the first level of confidence, the power listings backend coordinator 104 may categorize the potential matching listing as a probable matching listing. If the confidence score assigned to the potential matching listing is below the second level of confidence the power listings backend coordinator 104 may categorize the potential matching listing as a non-matching listing (i.e., listings having confidence scores so low that they obviously do not represent the merchant location). Non-matching listing are automatically discarded from further consideration by the power listings backend coordinator 104.

To calculate the confidence score, in one example, the power listings backend coordinator 104 may normalize the core listing information supplied by the merchant 38 and returned with each potential matching listing. Then the power listings backend coordinator 104 may assign up to one point for similarity of each of the following data fields: name, address (including city, state, and postal code), and primary phone number. The power listings backend coordinator 104 may also assign points for matches of non-primary phone numbers and merchant URL. If the potential matching listing has at least three points—which can happen only if the name, address, and primary phone number match exactly, or if two of the three match and the other fields match exactly—the listing is considered to be so perfect a match that the potential matching listing may be recorded as a confirmed matching listing without merchant verification (i.e., equal to or above a first level of confidence). If potential matching listing has a match of at least one point, then the potential matching listing may be considered a probable matching listing and can be presented to the merchant 38 and/or a human system operator 40 as such; otherwise, the potential matching listing is considered to be a non-matching listing.

If a potential matching listing is categorized as a confirmed matching listing or a probable matching listing, the power listings backend coordinator 104 records and associates the provider-supplied "external identifier" or "external ID" or "identifier" for the listing along with returned listing data (e.g., the name, address, telephone number, and URL associated with the listing found on the provider system 34a) in the system database 42. As used herein, an external identifier or an external ID or provider-supplied external identifier refers to a unique identifier that the provider system (e.g., 34a) assigns to a listing for their own purposes. This contrasts with a system-provided "listing identifier" or "Listing ID" that is a unique identifier assigned by the source system 32 to the same listing on a per provider/per listing (e.g., per business physical location) basis. The power listings backend coordinator 104 may have associated the provider-supplied external identifier of confirmed matching listings and probable matching listings with a corresponding system-supplied listing identifier in the system database 42 for the provider system (e.g., 34a). If the power listings backend coordinator 104 categorized the potential matching listing as a non-matching listing, then the non-matching listing may be discarded with no recording of its external identifier in the system database 42 and no association is made with a system-supplied listing identifier. Accordingly, the power listings backend coordinator 104 may to remove the non-matching listings, retain the confirmed matching listings and probable matching listings, and record the ranking of the confirmed matching listings and probable matching listings according to their confidence scores in the system database 42.

After the categorization and ranking process has been completed, a location of a business of the merchant may have no representation of a listing on the provider system (e.g., 34*a*), exactly one representation on the provider system (e.g., 34*a*), or multiple representations on the provider system (e.g., 34*a*).

The merchant 38 may instruct the power listings web application 102 to submit a listing order request using the listing identification data (e.g., basic content, along with enhanced static content) provided by the merchant 38. When there is no representation of a listing on the provider system (e.g., 34*a*), in order to avoid the possible creation of duplicate listings, the listing order request may be confirmed and approved by the merchant 38 and/or the human operator 40. If the power listings web application 102 receives a confirmation by merchant 38 and/or the human operator 40, the power listings backend coordinator 104 may instruct the listings delivery engine 114 to submit a listing order request (along with the basic and enhanced static content entered by the merchant 38) to the provider system (e.g., 34*a*) without a provider-supplied external identifier for the listing.

When there is exactly one representation of a listing on the provider system (e.g., 34*a*) and the listing identification data (e.g., basic content, along with enhanced static content) provided by the merchant 38 is categorized as a confirmed matching listing, the power listings backend coordinator 104 may instruct the listings delivery engine 114 to submit the listing order request (along with the basic and enhanced static content entered by the merchant 38) to the provider system (e.g., 34*a*) with no confirmation by the merchant 38 or the human operator 40 with a provider-supplied external identifier for the listing. If the listing identification data (e.g., basic content, along with enhanced static content) provided by the merchant 38 is categorized as a probable matching listing, the listing order request may be confirmed and approved by the merchant 38 and/or the human operator 40. If the power listings web application 102 receives a confirmation by merchant 38 and/or the human operator 40, the power listings backend coordinator 104 may instruct the listings delivery engine 114 to submit the listing order request (along with the basic and enhanced static content entered by the merchant 38) to the provider system (e.g., 34*a*).

When there are multiple representations of a listing on the provider system (e.g., 34*a*), the power listings backend coordinator 104 may instruct the listings delivery engine 114 to deliver all representations categorized as confirmed matching listings (including duplicates) to the provider system (e.g., 34*a*). If the multiple representations include one or more probable matching listings, then the one or more probable matching listings may be confirmed and approved by the merchant 38 and/or the human operator 40 before the power listings backend coordinator 104 instructs the listings delivery engine 114 to deliver the one or more probable matching listings (including duplicates) to the provider system (e.g., 34*a*).

When the power listings web application 102 categorizes the listing identification data as a non-matching listing, indicating that there is no representation of a listing on the provider system (e.g., 34*a*), the power listings web application 102 provides the merchant with an indication that the system 32 has found no matching listing corresponding to the listing identification data provided by the merchant 38 on the provider system (e.g., 34*a*). The power listings web application 102 provides the merchant 38 with the option of searching the provider system (e.g., 34*a*) using the provider search API 108 associated with the provider system (e.g., 34*a*). The provider search API 108 may return no listings to the power listings web application 102, indicating to the merchant 38 that there is no matching listing (as indicated by the merchant 38) on the provider system (e.g., 34*a*). The provider search API 108 may return one or more listings to the power listings web application 102, indicating to the merchant 38 that there is one or more possible matching listings on the provider system (e.g., 34*a*). The merchant 38 may select one best matching listing from the one or more possible matching listings as the listing to be represented on the provider system (e.g., 34*a*).

When there is no matching listing (as indicated by the merchant 38) on the provider system (e.g., 34*a*), the power listings web application 102 may receive a confirmation from the merchant that there is no matching listing on the provider system (e.g., 34*a*). The power listings web application 102 may instruct the listings delivery engine 114 to submit a listing order request (along with the basic and enhanced static content entered by the merchant 38) to the provider system (e.g., 34*a*).

When there is one best matching listing (as selected by the merchant 38) on the provider system (e.g., 34*a*), the power listings web application 102 may receive a confirmation from the merchant that there is one best matching listing (as confirmed by the merchant 38) on the provider system (e.g., 34*a*). The power listings backend coordinator 104 may transmit a listing order request (along with basic and enhanced static content entered by the merchant 38) for the best matching listing (as selected by the merchant 38) to the human review web application 107 for review by the human operator 40.

The power listings web application 102 may indicate a non-matching listing on the provider system (e.g., 34*a*), but the merchant 38 does not confirm that there is no matching listing on the provider system (e.g., 34*a*) within a specified period of time (i.e., a timeout period). According, if a timeout occurs, the power listings backend coordinator 104 may transmit the non-matching listing (e.g., the listing identification data (e.g., basic content, along with enhanced static content) entered by the merchant 34)) to the human review web application 107 for review by the human operator 40. The listing identification data and the non-matching categorization presented by the human review web application 107 may indicate to the human operator 40 that the system 32 cannot find a matching listing on the provider system (e.g., 34*a*). In one example, the human review web application 107 may receive a confirmation indication from the human operator 40 indicating to the human review web application 107 that there is no matching listing found on the provider system (e.g., 34*a*). Accordingly, the power listings backend coordinator 104 may instruct the listings delivery engine 114 to submit a listing order request (along with the basic and enhanced static content entered by the merchant 38) to the provider system (e.g., 34*a*).

In another example, the human review web application 107 may provide the human operator 40 with the option of searching the provider system (e.g., 34*a*) using the provider search API 108 associated with the provider system (e.g., 34*a*). The provider search API 108 may return no listings to the human review web application 107, indicating to the human operator 40 that there is no matching listing on the provider system (e.g., 34a). The provider search API 108 may return one or more listings to the human review web application 107, indicating to the human operator 40 that there is one or more possible matching listings on the provider system (e.g., 34a). The human operator 40 may select one best matching listing from the one or more possible matching listings as the listing to be represented on the provider system (e.g., 34a).

When there is no matching listing (as indicated by the human operator 40) on the provider system (e.g., 34a), the human review web application 107 may receive a confirmation from the human operator 40 that there is no matching listing on the provider system (e.g., 34a). The power listings backend coordinator 104 may instruct the listings delivery engine 114 to submit a listing order request (along with the basic and enhanced static content entered by the human operator 40) to the provider system (e.g., 34a).

When there is one best matching listing (as selected by the human operator 40) on the provider system (e.g., 34a), the human review web application 107 may receive a confirmation from the human operator 40 that there is one best matching listing on the provider system (e.g., 34a). The power listings backend coordinator 104 may transmit a listing order request (along with basic and enhanced static content entered by the human operator 40) for the best matching listing (as selected by the human operator 40) to the provider system (e.g., 34a).

If the system 32 categorizes the potential matching listing as probable matching listing for the provider system (e.g., 34a), then the merchant 38 and/or the human operator 40 needs to confirm that the probable matching listing is or is not a confirmed matching listing. More particularly, when the power listings backend coordinator 104 categorizes the listing identification data as a probable matching listing, indicating that there is a probable representation of a listing on the provider system (e.g., 34a), the power listings web application 102 may provide the merchant with an indication that the system 32 has found a probable matching listing corresponding to the listing identification data provided by the merchant 38 on the provider system (e.g., 34a). If the merchant 38 confirms that the listing identification data for the location of the business associated with the merchant 38 is a matching listing, the power listings web application 102 may receive an indication of a confirmation from the merchant 38. The power listings backend coordinator 104 may instruct the listings delivery engine 114 to submit a listing order request (along with the basic and enhanced static content entered by the merchant 38) to the provider system (e.g., 34a). If the merchant 38 confirms that the listing identification data for the location of the business associated with the merchant 38 is a non-matching listing, the power listings web application 102 may receive an indication of a non-confirmation from the merchant 38. Accordingly, the power listings web application 102 provides the merchant 38 with the option of searching the provider system (e.g., 34a) using the provider search API 108 associated with the provider system (e.g., 34a). The provider search API 108 may return no listings to the power listings web application 102, indicating to the merchant 38 that there is no matching listing (as indicated by the merchant 38) on the provider system (e.g., 34a). The provider search API 108 may return one or more listings to the power listings web application 102, indicating to the merchant 38 that there is one or more possible matching listings on the provider system (e.g., 34a). The merchant 38 may select one best matching listing from the one or more possible matching listings as the listing to be represented on the provider system (e.g., 34a).

When there is no matching listing (as indicated by the merchant 38) on the provider system (e.g., 34a), the power listings web application 102 may receive a confirmation from the merchant 38 that there is no matching listing on the provider system (e.g., 34a). The power listings backend coordinator 104 may instruct the listings delivery engine 114 to submit a listing order request (along with the basic and enhanced static content entered by the merchant 38) to the provider system (e.g., 34a).

When there is one best matching listing (as selected by the merchant 38) on the provider system (e.g., 34a), the power listings web application 102 may receive a confirmation from the merchant that there is one best matching listing (as confirmed by the merchant 38) on the provider system (e.g., 34a). The power listings backend coordinator 104 may transmit a listing order request (along with basic and enhanced static content entered by the merchant 38) for the best matching listing (as selected by the merchant 38) to the human review web application 107 for review by the human operator 40.

From the human review web application 107, the human operator 40 may be presented with one of the following: (1) the merchant 38 designated a categorized non-matching listing as a confirmed matching listing; (2) the merchant 38 designated a categorize probable matching listing as confirmed matching listing; (3) the merchant 38 designated a categorize probable matching listing as a non-matching listing and had selected another listing on the provider system (e.g., 34a) as a confirmed matching listing; or (4) the system 32 categorized a possible matching listing as a probable matching listing, but the merchant 38 did not confirm the probable matching listing as a confirmed matching listing within a timeout period. In such circumstances, the human operator 40 reviews the listing identification data (e.g., the basic content of name, street address, and telephone number), the static enhanced content, and the probable matching listing that the system 32 had categorized as such or an alternative listing that the merchant had selected.

In one example, the human operator 40 may confirm the probable matching listing (selected by the merchant 38 or the system 32) as a confirmed matching listing. Accordingly, the power listings backend coordinator 104 may instruct the listings delivery engine 114 to submit a listing order request (along with the basic and enhanced static content entered by the merchant 38) to the provider system (e.g., 34a).

In another example, the human operator may search for and select an alternative listing on the provider system (e.g., 34a) as a more suitable matching listing for the location of the business associated with the merchant 38. More particularly, the human review web application 107 may provide the human operator 40 with the option of searching the provider system (e.g., 34a) using the provider search API 108 associated with the provider system (e.g., 34a). The provider search API 108 may return no listings to the human review web application 107, indicating to the human operator 40 that there is no matching listing on the provider system (e.g., 34a). The provider search API 108 may return one or more listings to the human review web application 107, indicating to the human operator 40 that there is one or more possible matching listings on the provider system (e.g., 34a). The human operator 40 may select one best matching listing from the one or more possible matching listings as the listing to be represented on the provider system (e.g., 34a).

When there is no matching listing (as indicated by the human operator 40) on the provider system (e.g., 34a), the human review web application 107 may receive a confirmation from the human operator 40 that there is no matching listing on the provider system (e.g., 34*a*). Accordingly, the power listings backend coordinator 104 may instruct the listings delivery engine 114 to submit a listing order request (along with the basic and enhanced static content entered by the human operator 40) to the provider system (e.g., 34*a*).

When there is one best matching listing (as selected by the human operator 40) on the provider system (e.g., 34*a*), the human review web application 107 may receive a confirmation from the human operator 40 that there is one best matching listing on the provider system (e.g., 34*a*). The power listings backend coordinator 104 may transmit a listing order request (along with basic and enhanced static content entered by the human operator 40) for the best matching listing (as selected by the human operator 40) to the provider system (e.g., 34*a*).

In an example, the process of finding zero or more potential matching listings and selecting the best matching listing may be repeated for the remaining provider systems (e.g., 34*b*-34*n*) of the plurality of provider systems 34*a*-34*n*. In the event that the best matching listing selected on one provider system (e.g., 34*a*) does not match the best matching listing selected on another provider system (e.g., 34*b*), the merchant 38 and/or the human operator 40 may select one of the listings from among the provider systems 34*a*-34*n* as the final best matching listing. Once the final best matching listing is determined, the final best matching listing may be delivered to each of the provider sites 34*a*-34*n* either substantially simultaneously or in selected groupings.

The listings delivery engine 114 is responsible for delivering listing information to one or more of the plurality of provider systems 34*a*-34*n*. The listings delivery engine 114 may receive listing identification data (basic and enhanced static content entered by the merchant 38 or the human operator 40) corresponding to the final best matching listing (new as input by the merchant 38 or human operator 40 or selected from among the provider systems 34*a*-34*n*) and an identifier that indicates whether or not there is a matching listing (as indicated by the presence or absence of a provider-supplied external identifier associated with the final best matching listing in the system database 42, and an identifier of the provider system (e.g., 34*a*). The listings delivery engine 114 then transmits this data to the one or more of the plurality of provider systems 34*a*-34*n* using a deliver mechanism supported by the provider listing update APIs or periodic feed receiver module 112. The delivery method varies (via a real-time update API or via a periodic feed file described below) depending on the capability of a provider system (e.g., 34*a*). As noted above, when there is no match for a location of a business associate with a merchant 38, a listing is to be created on the provider system (e.g., 34*a*) as indicated by the absence in the data to be transmitted of an associated provider-supplied external identifier. When there is a final best matching listing for a location of a business associate with a merchant 38, a listing is to be updated on the provider system (e.g., 34*a*), which is indicated by the presence in the data to be transmitted of an associated provider-supplied external identifier. The listing delivery engine 114 may be configured to receive a receipt file from the provider system (e.g., 34*a*) that indicates success or failure of the creation of a listing or an update to the listing to be described hereinbelow.

Figure 5:
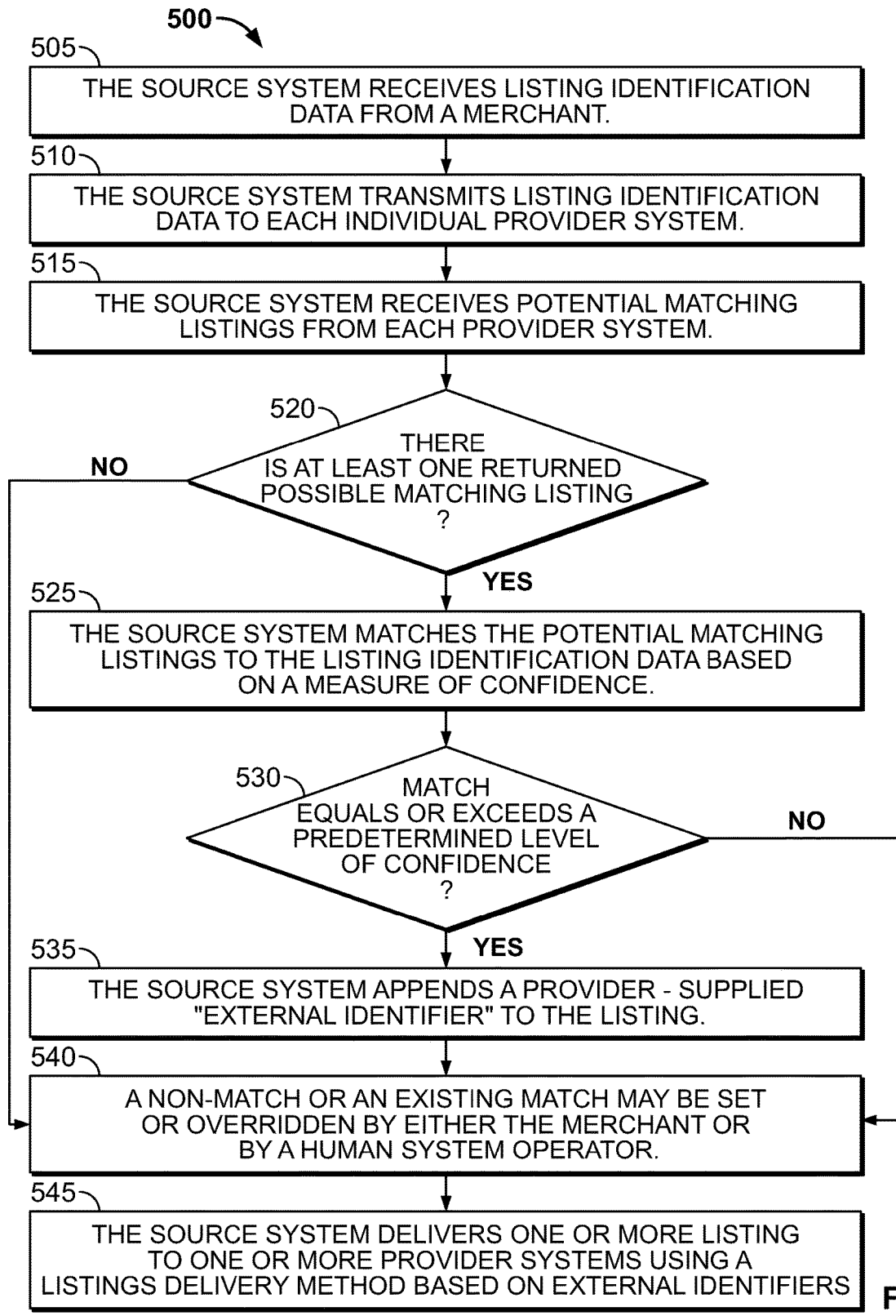
FIG. 5 is a flow diagram illustrating an example of a method for providing enhanced listings to multiple search service providers from the single source system when a single listing is designated either automatically by the source system, or by one or both of the merchant or the human operator as the synchronized (e.g., selected) listing to be propagated to the provider systems.

FIG. 5 is a flow diagram illustrating an example of a method 500 for providing enhanced listings to multiple search service providers 34*a*-34*n* from the single source system 32 when a single listing is designated either automatically by the source system 32, or by one or both of the merchant 38 or the human operator 40 as the synchronized (e.g., selected) listing to be propagated to the provider systems 34*a*-34*n*.

The method 500 may be performed by the source system 32 of FIG. 4 and may comprise hardware (e.g., circuitry, dedicated logic, programmable logic, microcode, etc.), software (e.g., instructions run on a processing device), or a combination thereof. In one example, the method 500 is performed by processing logic (not shown) of the source system 32 of FIG. 5.

As shown in FIG. 5, at block 505, the source system 32 may receive listing identification data from a merchant 38. At block 510, the source system 32 may transmit listing identification data to one or more of the provider systems 34*a*-34*n*. At block 515, the source system 32 may receive zero or more possible matching listings are from the one or more provider systems 34*a*-34*n*. At block 520, if there is at least one returned possible matching listing, at block 525, the source system 32 may match the at least one possible matching listing to the listing identification data based on a measure of confidence. At block 530, if a possible matching listing equals or exceeds a predetermined level of confidence (e.g., a calculated measure of confidence is equal to or above a first level of confidence, indicating a matching listing, or above a second level of confidence less than the first level of confidence, indicating a probable matching listing), then at block 535, the source system 32 may append a provider-supplied external identifier to (e.g., associated with) the listing. Optionally, at block 540, the source system 32 may receive from the merchant 38 or by a human system operator 40 an override of a non-matching listing or a probable matching listing with another listing. At block 540, the source system 32 may receive a selection of a best matching listing from among the one or more possible matching listings received from the one or more provider systems 34*a*-34*n* either automatically or by the merchant 38 and/or the human operator 40. At block 545, the source system 32 may transmit the final best matching listing to one or more provider systems 34*a*-34*n* using a listings delivery method based on the presence or absence of the provider-supplied external identifier associated with the final best matching listing.

In one example, when the listing identification data provided automatically by the one or more provider systems 34*a*-34*n* or overridden by either the merchant 38 or the human system operator 40 is determined to be associated with a final best matching listing, the source system 32 may deliver the final best matching listing (i.e., synchronizes) to the one or more provider systems 34*a*-34*n* with the provider-supplied external identifier as an indication to the one or more provider systems 34*a*-34*n* to update an enhanced listing with enhanced content. When the listing identification data provided automatically by the one or more provider systems 34*a*-34*n* or overridden by either the merchant 38 or the human system operator 40 is determined not to be associated with a final best matching listing, the source system 32 may deliver a listing (i.e., synchronizes the listing) without the provider-supplied external identifier as an indication to the one or more provider systems 34*a*-34*n* to create an enhanced listings using the enhanced content proved by the merchant 38 or the human operator 40.

Figure 6A:
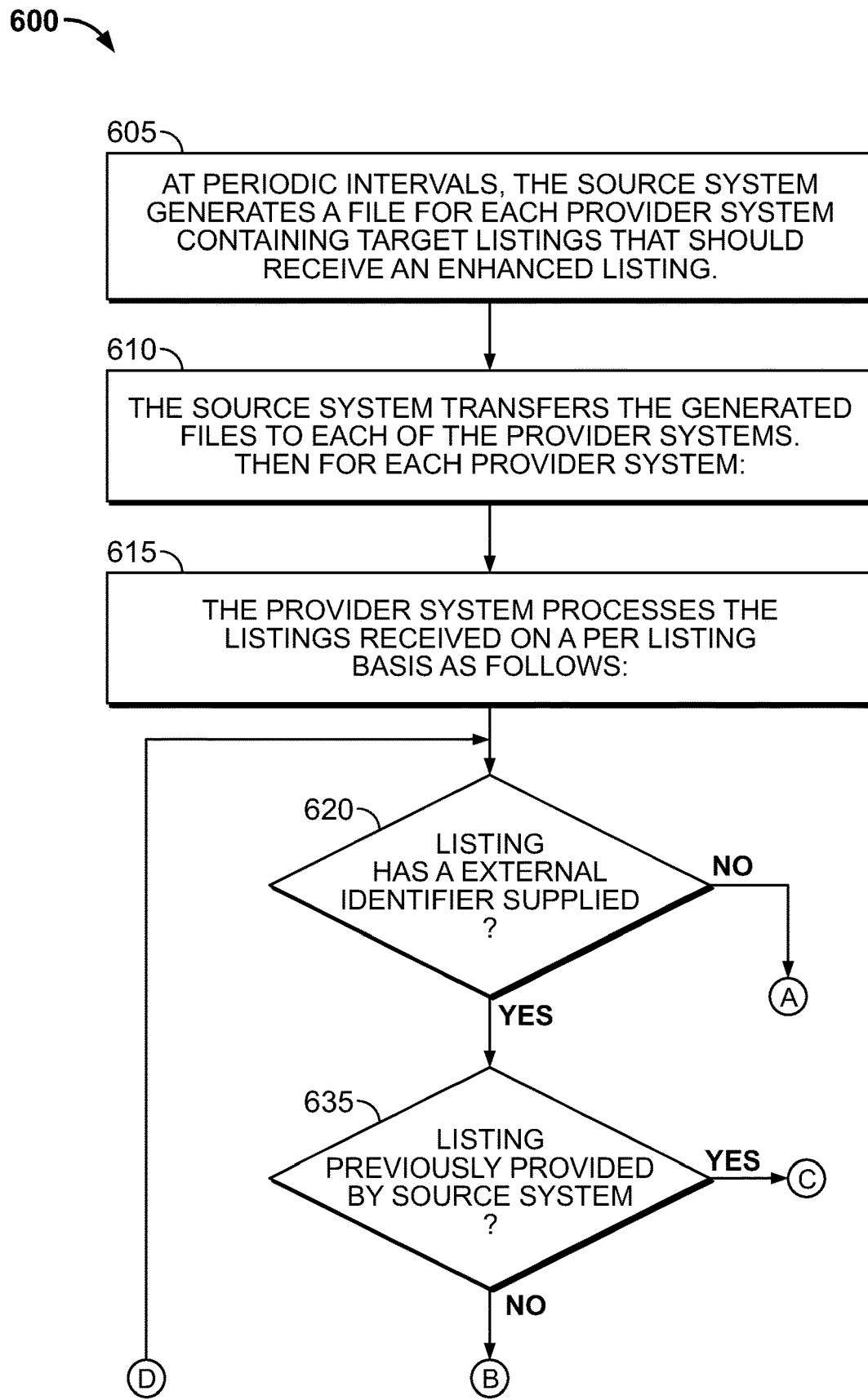
FIGS. 6A and 6B are flow diagram illustrating an example of a employing a periodic feed files delivery method for delivering basic content and enhanced static content to each of the provider systems from a single source system.
Figure 6B:
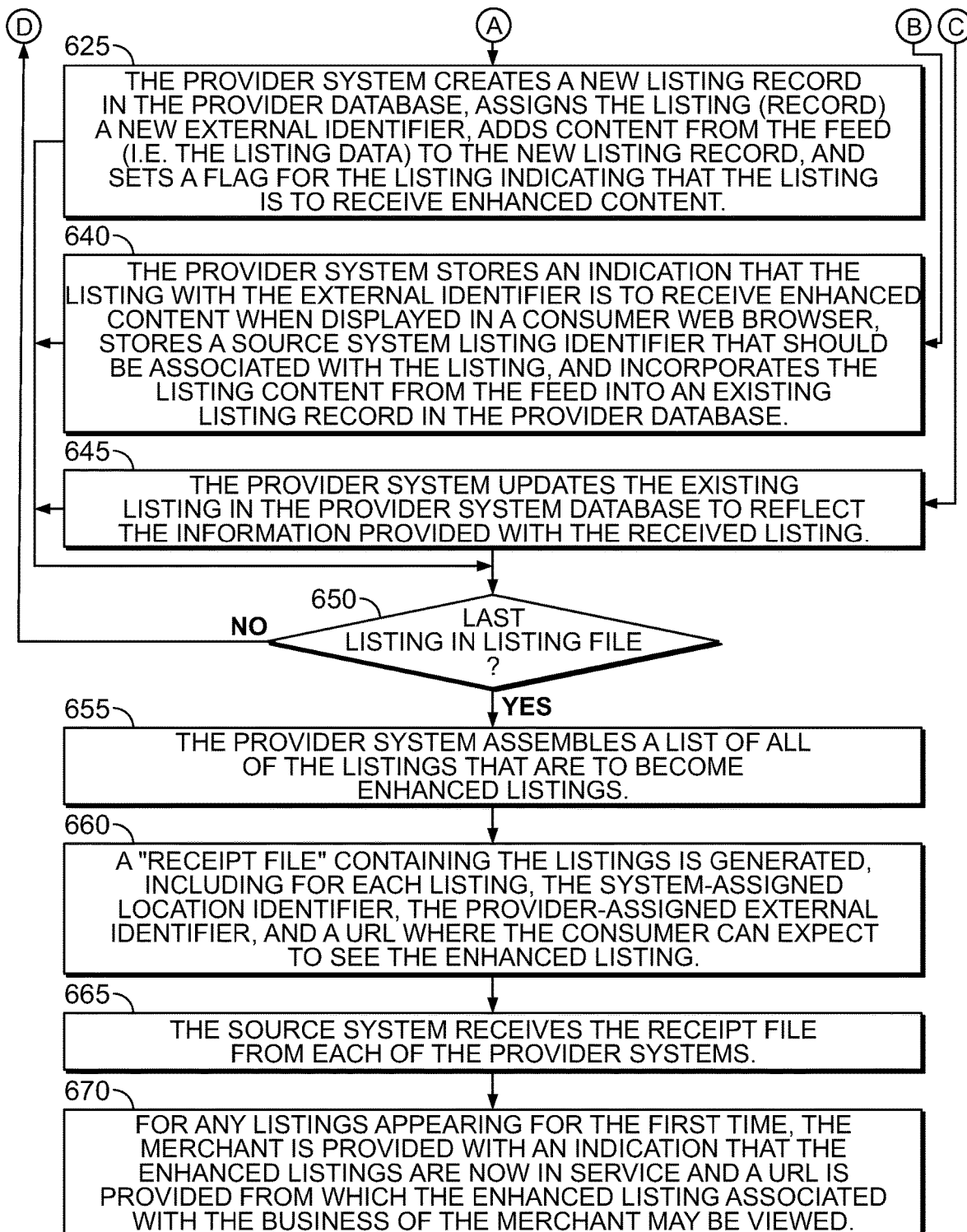

FIGS. 6A and 6B are flow diagram illustrating an example of employing a periodic feed files delivery method 600 for delivering basic content and enhanced static content to each of the provider systems 34*a*-34*n* from a single source system (i.e., the source system 32). The method 600 may be performed by the source system 32 of FIG. 3 and may comprise hardware (e.g., circuitry, dedicated logic, programmable logic, microcode, etc.), software (e.g., instructions run on a processing device), or a combination thereof. In one example, the method 600 may be performed by processing logic (not shown) of the source system 32 of FIG. 4.

As shown in FIGS. 6A and 6B, at block 605, at periodic intervals, e.g., each day, the listings delivery engine 114 may generate a file for each provider system 34a-34n containing associated target listings that should receive an enhanced listing. This file may include, but is not limited to, basic content, static enhanced content, and the provider-supplied external identifier previously identified and associated with one or more listings to be delivered, if available. If the provider-supplied external identifier for a given listing is not provided, then this is an indication that the listing does not exist on the provider system (e.g., 34a) and should be created by the provider system (e.g., 34a). At block 610, for each of the provider systems 34a-34n, the listings delivery engine 114 may transmit the generated file to the corresponding provider system (e.g., 34a). The listings delivery engine 114 may transfer a corresponding generated file to the corresponding provider system (e.g., 34a) via a corresponding provider periodic feed receiver 112 (using mechanisms that may include, for example, HTTP, FTP, or a custom API). Then, for each individual provider system (e.g., the provider system 34a), blocks 615-670 are executed as described hereinbelow.

At block 615, the provider system 34a may process the listings file received at block 610 on a per listing basis. At block 620, the provider system (e.g., 34a) may query whether the listing contains an external identifier. If, at block 620, the listing does not have an external identifier, then at block 625, the provider system (e.g., 34a) may create a new listing record in the provider database 44a, may assign the listing (record) a new external identifier, may add basic content and enhanced static content from the feed (i.e. the listing data) to the new listing record, and may set a flag for the listing indicating that the listing should have dynamic enhanced content when displayed in a consumer web browser 120 as provided by the corresponding provider directory site 116. If, at block 620, an external identifier for the listing was supplied, then at block 635, the provider system (e.g., 34a) may query whether the listing was provided before by the source system 32. If, at block 620, an external identifier was supplied, but the listing was not previously provided by the source system 32, then at block 640, the provider system (e.g., 34a) may store an indication that the listing with the external identifier is to receive basic enhanced content and enhanced static content when displayed in a consumer web browser 120 as provided by a provider directory site 116 associated with the provider system 34a, may store a source system listing identifier to be associated with the listing, and may incorporate the listing basic content and enhanced static content from the feed into an existing listing record in the provider database (e.g., 44a). If, at block 620, an external identifier was supplied, and at block 635, a listing was previously provided by the source system 32, then, at block 645, the provider system 34a may update the existing listing using the basic content and enhanced static content in the provider database 44a to reflect the information provided with the received listing. At block 650, the provider system (e.g., 34a) may query whether there are any more listings in the listing file to be processed. If at block 650, the last listing in the listing file has not been processed, then execution returns to block 620; otherwise, processing proceeds to block 655.

At block 655, the provider system 34a may assemble a list of all of the listings that the provider system 34a indicates are to have basic content and enhanced static content (see FIGS. 7A-7C), and at block 660, the provider periodic feed interface 112 corresponding to the provider system 34a may generate a "receipt file" containing these listings, including for each listing, the system-assigned listing identifier, a provider-supplied external identifier, and a URL where the consumer 46 can expect to see the enhanced listing on the provider system. At block 665, the source system 32 may receive the receipt file from each of the provider systems 34a-34n wherein the provider periodic feed interface 112 returns the receipt file to the listings delivery engine 114. The power listings backend coordinator 104 may receive the receipt files from provider periodic feed interface 112. At block 670, for any listings appearing for the first time as determined by a query into the system database 42 by the power listings backend coordinator 104, the power listings backend coordinator 104 may provide the merchant 38 via the power listings web application 102 with an indication that that the enhanced listings are now in service, and may supply the merchant 38 with a URL from which the enhanced listing associated with the business of the merchant 38 may be seen. In an example, the power listings backend coordinator 104 may employ a web crawler to confirm that the enhanced listing is visible on the supplied URL and that all content, including basic content, static enhanced content, and dynamic enhanced content, etc. is visible and correct, before notifying the merchant 38 that the enhanced listing is live.

FIGS. 7A-7C show an example of a list of all of the listings 700 that should be enhanced listings, as provided by the source system 32 to the provider system 34a. Reference 702 points to a first listing in XML. Reference 704 points to an example of a provider-supplied external identifier. Reference 706 points to an example of a promotional message. Reference 707 refers to an example of a list of structured listings. Reference 708 points to the beginning of a second listing, while reference 710 points to the end of the second listing.

FIG. 8 shows an example of a receipt file 800 containing the listings of FIGS. 7A and 7B. Each block 802 includes, for example, pairs of source system provided identifiers 804 and associated provider-supplied external identifiers 806.

Figure 9:
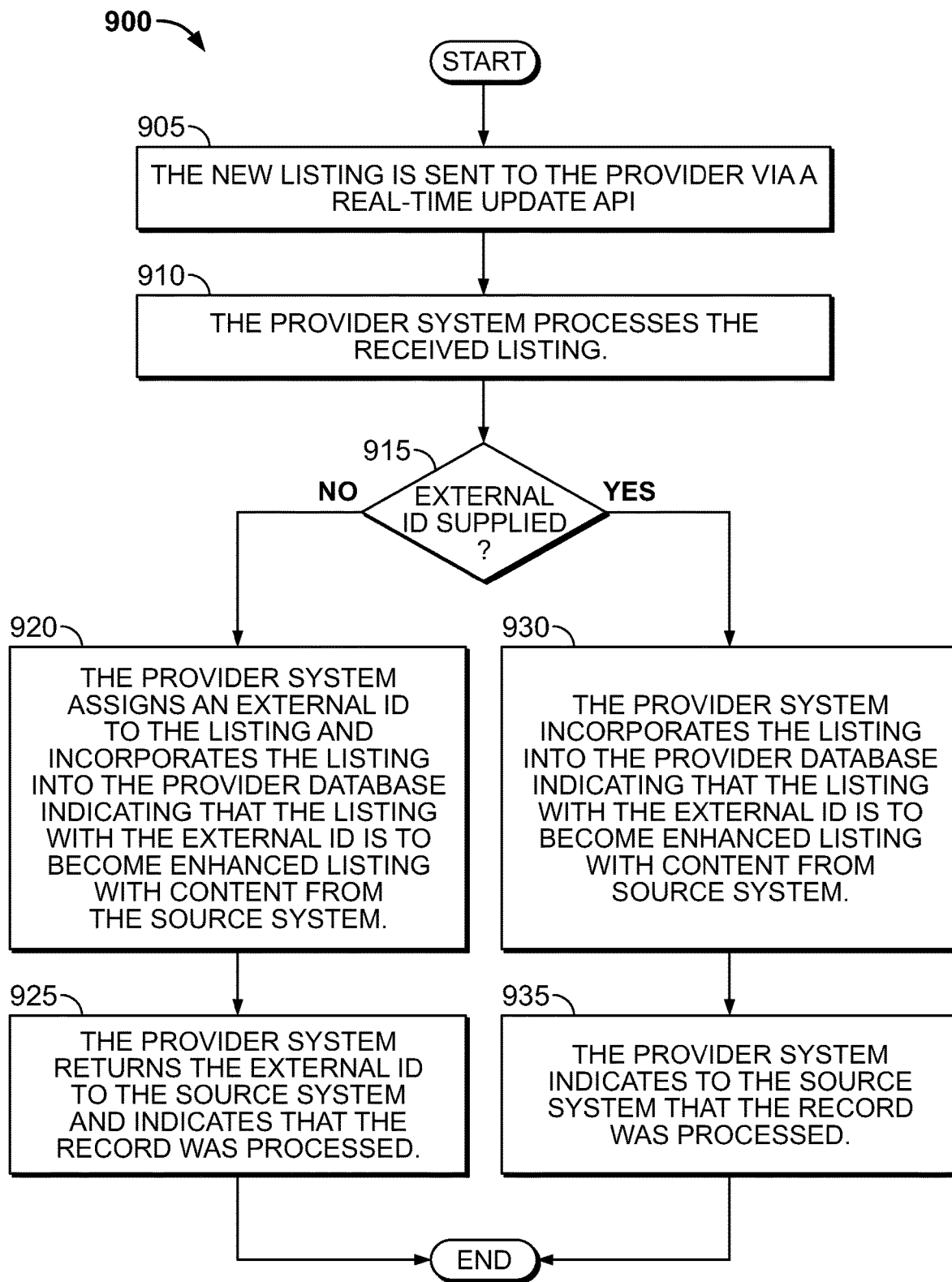
FIG. 9 is one example of a flow diagram illustrating an example of a employing a real-time API integration delivery method for delivering basic content and enhanced static content to each of the provider systems from a single source system.

FIG. 9 is a flow diagram illustrating an example of employing a real-time API integration delivery method 900 for delivering basic content and enhanced static content to each of the provider systems 34a-34n from a single source system (i.e., the source system 32). The method 900 may be performed by the source system 32 of FIG. 4 and may comprise hardware (e.g., circuitry, dedicated logic, programmable logic, microcode, etc.), software (e.g., instructions run on a processing device), or a combination thereof. In one example, the method 900 may be performed by processing logic (not shown) of the source system 32 of FIG. 4.

As shown in FIG. 9, at block 905, the listing delivery engine 114 of the source system 32 may transmit the new listing to the provider listing update API 150. At block 910, the provider system (e.g., 34a) may process the received listing by applying different logic at block 915 based on whether the source system 32 supplies a provider-supplied external identifier. If, at block 915, no external identifier for the listing was provided, then this may serve as an instruction to the provider system (e.g., 34a) to add a new listing. At block 920, the provider system (e.g., 34a) may add the new listing in near real-time, may assign it a provider-supplied external identifier, and may record an indication that it should be an enhanced listing, including saving any basic content and enhanced static content that was transmitted along with it by the source system 32. At block 925, the provider system (e.g., 34*a*) may return the newly-assigned provider-supplied external identifier to the source system 32 along with a confirmation that the listing will become an enhanced listing. If, at block 915, the source system 32 had transmitted a provider-supplied external identifier, the provider system (e.g., 34*a*) may save an indication in its database (e.g., 44*a*) that the listing should be an enhanced listing (block 930) and may transmit a confirmation to the source system 32 that the request was processed (block 935).

In general, a provider system (e.g., 34*a*) may accept and may update matching listings that are found by the source system 32. However, given basic content of a location, a provider system (e.g., 34*a*) may perform their own matching method. Per location and provider system (e.g., 34*a*), the power listings backend coordinator 102 may determine and respond to a selection of an alternative listing by the provider system (e.g., 34*a*) by comparing the provider-supplied external identifier returned in a response (e.g., a receipt file) from the provider system (e.g., 34*a*) to the provider-supplied external identifier that is returned in an API search response (or feed receipt) to the provider-supplied external identifier identified by the source system 32 during the matching process. If there is a difference, the source system 32 may override the provider-supplied external identifier currently present in the source system database 42 with the provider-supplied external identifier provided by the provider system (e.g., 42*a*).

In one example, the merchant 38 (e.g., user of the source system 32) or the human operator 40 may find that there is more than one probable matching listing or matching listing currently residing on a provider system (e.g., 34*a*). Accordingly, the merchant 38 or the human operator 40 may request the source system 32 to suppress one or more duplicate listing on the provider system (e.g., 34*a*). The merchant 38 or the human operator 40 may need to confirm all probable duplicate listings on a provider system (e.g., 34*a*) that were determined by the source system 32 before having the listing delivery engine 114 of the source system 32 transmit any requests to suppress the probable duplicate listings.

When the merchant 38 is to confirm listings that should be suppressed, the merchant 38 may review a display associated with the power listings web application 102 of the source system 32 to observe the listing selected by the source system 32 as a current synchronized match (e.g., the listing determined by the system as the best matching listing). The merchant 38 may take one of two actions: (1) the merchant 38 may verify that the probable duplicate matches, which were found by the source system 32, should be suppressed. Accordingly, the merchant 38 may transmit one or more suppression requests using the power listings web application 102 and the listing delivery engine 114 of the source system 32; or, (2) the merchant 38 may reject probable duplicate matches that were detected by the source system 32. The merchant 38 may instruct the power listings web application 102 to mark the rejected duplicate(s) as non-matches and store this information in the system database 42, so that the rejected duplicate matches would not be re-submitted for review in future duplicate scans.

From the human review web application 107, the human operator 40 may confirm the following types of duplicate listings: (1) the source system 32 has identified probable duplicates, but the merchant 38 has not verified or confirmed whether the subject listings are duplicates within a specified period of time, or (2) the merchant 38 has submitted one or more requests to suppress potential duplicate listings (of a location on a provider site), and these listings need to be reviewed by the human operator 40.

Figure 10:
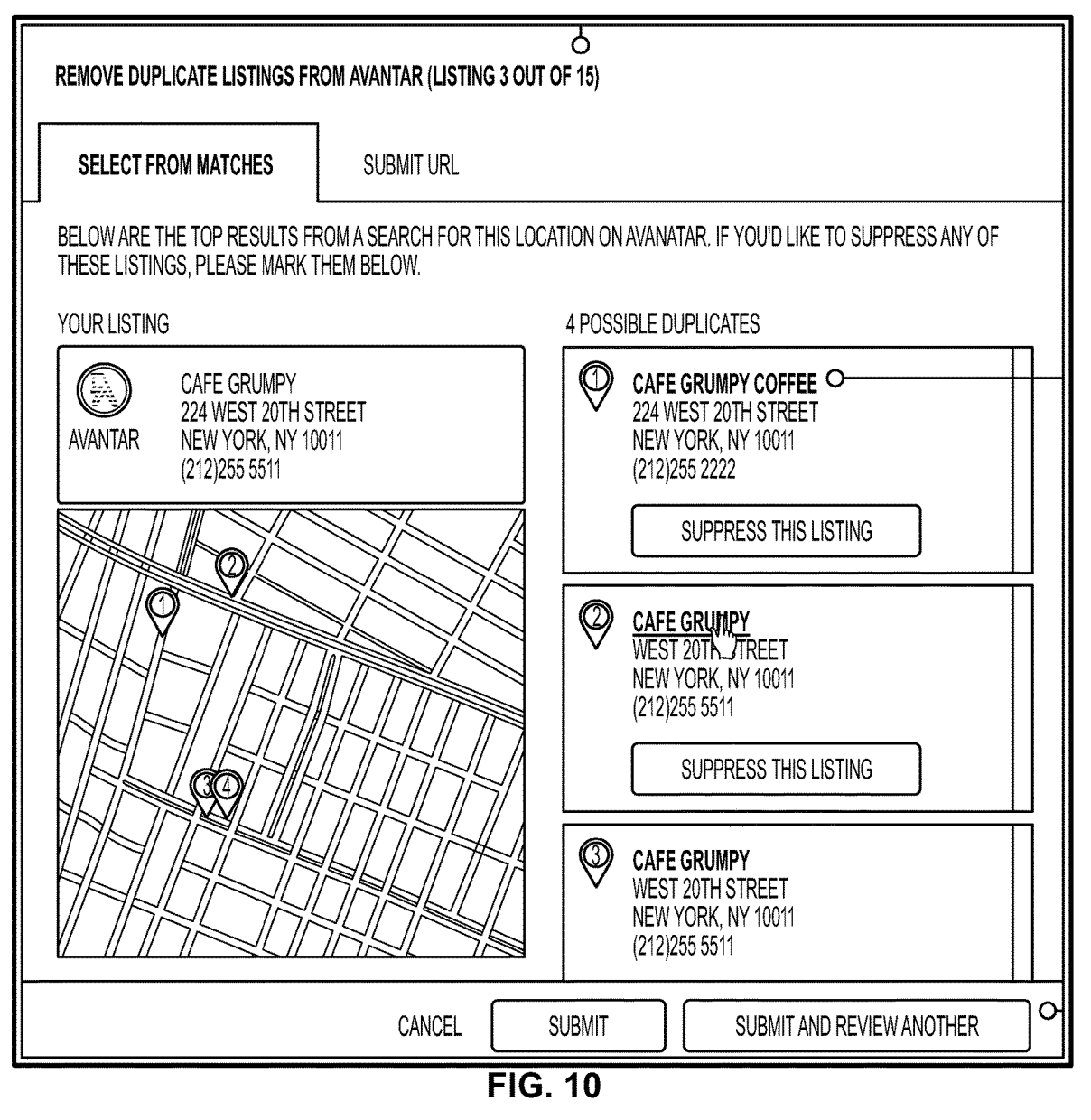

Accordingly, the human operator 40 may view the listing identification information, the synchronized listing, and the list of probable duplicates from the human review web application 107. Accordingly, the human operator 40 may confirm one or more probable duplicate listings need to be suppressed. The human operator 40 may employ the listing delivery engine 114 to deliver suppression requests. In another example, the human operator 40 may reject the one or more probable duplicate listings. The human operator may employ the power listings backend coordinator 104 to store one or more indications of rejected probable duplicates as non-matching listings in the system database 42 so as to avoid these listings in subsequent scans for duplicate listings. FIG. 10 shows a screen shot for the source system 32 removing duplicate lists associate with a location of a business.

In one example, the suppression request may be submitted using an application programming interface (e.g., the provider listing update APIs 150). Accordingly, the power listings backend coordinator 102 may transmit the provider supplied external identifier of a listing that is to be suppressed and the provider supplied external identifier of the representative listing to the provider system (e.g., 34*a*). The provider system (e.g., 34*a*) may respond with an indication of whether or not the suppression attempt was successful.

In another example, the suppression request may be submitted using a feed (e.g., the provider periodic feed receiver 112). Accordingly, the power listings backend coordinator 102 may transmit the provider supplied external identifier of a listing that is to be suppressed and the provider supplied external identifier of the representative listing to the provider system (e.g., 34*a*). The provider system (e.g., 34*a*) may respond with an indication of whether or not the suppression attempt was successful by producing a feed receipt file.

In one example, a merchant 38 or a human operator 40 may verify whether the source system 32 had suppressed the one or more duplicate listings after receiving confirmation from the source system 32 of a successful suppression of the one or more duplicate listings by the source system 32. The merchant 38 or a human operator 40 may attempt to view whether the suppression attempt was successful by initiating a command to retrieve the suppressed listing on the provider system (e.g., 34*a*) in the power listings web application 102 or the human review web application 107, respectively. In one example, the merchant 38 or a human operator 40 may input a universal resource locator (URL) of the suppressed listing if the computing device supports input of URLs. In another example, for mobile applications without fields for inputting URLs, the duplicate listing may be removed from a search results page (SERP).

The power listings web application 102 or the human review web application 107, respectively, may direct the power listings backend coordinator 104 to initiate the suppression verifier 154 to confirm whether the one or more duplicate listings are suppressed. How the suppression verifier 154 confirms whether the one or more duplicate listings are suppressed varies depending on the type of suppression behavior that a provider system (e.g., 34*a*) supports. In one example, the suppression verifier 154 may return the appropriate results to the power listings backend coordinator 104 and thence to the power listings web application 102 or the human review web application 107, respectively, for display to the merchant 38 or a human operator 40, respectively.

Table 1 summarizes examples of suppression behavior by the provider system (e.g., 34a), a description of the suppression behavior, and corresponding verification mechanisms.

TABLE 1

| Suppression Behavior | Description | Verification Mechanism |
|---|---|---|
| Error | The provider system serves a 404 error when consumer reaches the duplicate listing URL | The human review web application 107 calls the Details API 152 with the provider-supplied external identifier of the suppressed listing. The human review web application 107 should receive a 404 listing not found response. |
| Additional URL | The content on the duplicate listing is merged to the synchronized listing. The provider system directs user to the synced listing when consumer reaches duplicate listing URL. | The human review web application 107 calls the Details API 152 with the provider-supplied external identifier of the suppressed listing. The human review web application 107 should receive a 301 (URL redirected) response. |
| Redirect | The duplicate listing URL is removed, and when reached, the provider system directs consumers to the synced listing URL. | The human review web application 107 calls the Details API 152 with the provider-supplied external identifier of the suppressed listing. The human review web application 107 should receive a 301 (URL redirected) response. |
| Remove from search | The duplicate listing is removed from the search result page (SERP). This is mostly utilized by mobile apps (where user can't navigate to the duplicate URL directly). | The human review web application 107 calls the Search API 108 with the location information, and makes sure that the suppressed listing is not returned in the search results. |

Referring to Table 1, one type of suppression behavior supported by the provider system (e.g., 34a) may be to produce an error message. In one example, when a merchant 38 or a human operator 40 inputs a URL of the duplicate listing, the provider system (e.g., 34a) may provide a standard 404 error message (e.g., listing not found). The suppression verifier 154 may call the provider details APIs 152. The human review web application calls the details API 152 of the provider system (e.g., 34a) with the provider supplied external identifier of the suppressed listing. The suppression verifier 154 may receive a 404 listing not found response.

In another example, an additional URL may be provided. The content of the duplicate listing may be merged to the representative (synchronized) listing. The provider system (e.g., 34a) may direct the user (e.g., the merchant 38 or a human review operator 40) to the representative listing when the consumer inputs the URL of the suppressed listing. The suppression verifier 154 may call the details API 152 of the provider system (e.g., 34a) with the provider-supplied external identifier of the suppressed listing. The suppression verifier 154 may receive a 301 (URL redirected) response.

In another example, the user (e.g., the merchant 38 or a human operator 40) may be redirected to a URL of the representative listing. The provider system (e.g., 34a) may direct the user (e.g., the merchant 38 or a human review operator 40) to the representative listing when the consumer inputs the URL of the suppressed listing. The duplicate listing URL may be removed, and when reached, the provider system (e.g., 34a) provider may direct the user to the representative (synchronized) listing directly. The provider system (e.g., 34a) may direct the user (e.g., the merchant 38 or a human review operator 40) to the representative listing when the consumer inputs the URL of the suppressed listing. The suppression verifier 154 may call the details API 152 of the provider system (e.g., 34a) with the provider-supplied external identifier of the suppressed listing. The suppression verifier 154 may receive a 301 (URL redirected) response. In another example, the duplicate listing may be completely removed from a search results page (SERP).

With mobile apps, wherein a user cannot navigate to the duplicate URL directly, suppression verifier 154 may call the search API 108 of the provider system (e.g., 34a) with the listing identification information of the suppressed listing. The search API 108 of the provider system (e.g., 34a) may return an indication that the listing does not exist on the provider system (e.g., 34a).

FIG. 11 shows a screen shot of a search results page provided to the merchant 38 or a human review operator 40. From the power listings web application 102 or the human review web application 107, respectively, the merchant 38 or a human review operator 40, respectively, may view all duplicates that have been suppressed (or are being suppressed). Information provided by the power listings web application 102 or the human review web application 107, may include, for example, listing identification information, the provider supplied external identifier, a suppression status (which indicates the progress of the suppression attempt), provider suppression behavior, and the suppressed URL.

Table 2 displays examples of suppression status that the merchant 38 or a human review operator 40, respectively. One example of a status state is "processing." When the suppression state is "processing," the duplicate listing has been identified, and suppression attempt has started, but has not yet been completed. Another example of a suppression state is "suppressed." When the suppression state is "suppressed," the duplicate listing successfully suppressed, and is verified as suppressed by the suppression verifier 154. Another example of a suppression state is "unavailable." When the suppression state is "unavailable," the duplicate listing cannot be suppressed (or cannot be verified successfully). The merchant 38 or a human review operator 40, respectively, may view an unavailable reason provided by the power listings backend coordinator 104.

TABLE 2

| Suppression Status | Description |
|---|---|
| Processing | Duplicate has been identified, and suppression attempt has started. |
| Suppressed | Duplicate has been successfully suppressed, and is verified by suppression verifier 154. |
| Unavailable | The duplicate cannot be suppressed (or can't be verified successfully). The merchant 38 can see an unavailable reason provided by the power listings web application 102. |

Examples of the present disclosure are subject to numerous variations. For example, the power listings backend coordinator 104 may find more than one potential (good or probable) matches for a listing. Rather than automatically decide which listing should be the representative listing (synchronized listing), the power listings backend coordinator 104 may present a whole set of listings returned by the power listings web application 102 or the human review web application 107, respectively, to the merchant 38 or a human review operator 40, respectively. The merchant 38 or a human review operator 40, respectively, may decide which potential match should be employed as the representative listing (synchronized listing), and which ones are duplicates.

Since duplicate listings can continuously be created, the merchant 38 or a human review operator 40, respectively, may be provided with the ability to initiate subsequent suppression attempts. In one example, subsequent suppression attempts may be initiated by the power listings backend coordinator 104. After an initial setup, and for each location of a listing having a representative (synchronized) listing, the power listings backend coordinator 104 may periodically instruct the provider API searcher 106 to search for additional duplicates on the provider systems 34a-34n through the provider details API 152 of the provider system (e.g., 34a). Additional duplicates that are found may be confirmed by merchant 38, the human review operator 40, or the power listings backend coordinator 104 as described hereinabove.

Figure 12:
FIG. 12 shows a screen shot illustrating a successful attempt to suppress a duplicate listing manually.

In another example, subsequent suppression attempts may be initiated by the merchant 38 or the human review operator 40. The merchant 38 or the human review operator 40 may direct the provider API searcher 106 to search for additional duplicates of a listing for a location on a provider site (e.g., 34a). If duplicates are found, the merchant 38 or the human review operator may confirm the duplicates (as described above). In another example, the merchant 38 or the human review operator 40 may manually submit data for a duplicate listing of a location on a provider system (e.g., 34a). The merchant 38 or the human review operator 40 may enter a URL for a duplicate listing in the power listings web application 102 or the human review web application 107, respectively. The power listings backend coordinator 104 may extract the provider-supplied external identifier of the listing from the URL retrieve and display the details of the listing received from the provider details API 152. The merchant 38 or the human review operator 40 may confirm or deny whether the power listings backend coordinator 104 had provided the correct information that corresponds to the submitted URL. If so, the power listings web application 102 or the human review web application 107 may transmit the request to be approved by the merchant 38 or the human review operator 40, respectively (as described hereinabove). If not, the power listings backend coordinator 104 may discard the submitted URL. FIG. 12 shows a screen shot illustrating a successful attempt to suppress a duplicate listing manually.

In another example, duplicates may be suppressed at the business level. From time to time, merchants may have locations/stores that are closed prior to them signing up with the source system 32. If so, the merchant 38 may provide the source system 32 with a list of the closed store listings. The list may be supplied to the source system 32, which in turn may submit the list to one or more of the provider systems 34a-34n to be suppressed.

FIG. 13 is a flow diagram illustrating an example of a method 1300 for suppressing a duplicate listing given a known representative (synchronized) listing on a provider system (e.g., 34a) from a source system 32. The method 1300 may be performed by the source system 32 of FIG. 4 and may comprise hardware (e.g., circuitry, dedicated logic, programmable logic, microcode, etc.), software (e.g., instructions run on a processing device), or a combination thereof. In one example, the method 1300 may be performed by processing logic (not shown) of the source system 32 of FIG. 4.

As shown in FIG. 13, at block 1305, the source system 32 may select a representative listing of an entity (e.g., a business, an organization, a government agency, etc.) located on a provider system (e.g., 34a). The representative listing may comprise first identification data and a first provider-supplied external identifier. Accordingly, at block 1310, the source system 32 may search the provider system (e.g., 34a) for additional listings having identification data matching the first identification data. At block 1315, the source system 32 may receive from the provider system (e.g., 34a) a potential matching listing having identification data matching the first identification data and having a second provider-supplied external identifier that differs from the first provider-supplied external identifier. At block 1320, the source system 32 may designate the potential matching listing as a duplicate listing. At block 1325, the source system 32 may transmit a request to the provider system (e.g., 34a) to suppress the designated duplicate listing on the provider system (e.g., 34a). The request may comprise the second provider-supplied external identifier.

In one example, the source system 32 may update in the system database 42 associated with the source system 32, a record associated with the potential matching listing with an indication that the potential matching listing is a duplication listing on the provider system (e.g., 34a). In an example, the indication may comprise the second provider-supplied external identifier.

In an example, responsive to the source system 32 receiving an acknowledgement from the provider system (e.g., 34a) that the provider system (e.g., 34a) has accepted the request to suppress the designated duplicate listing in view of the second provider-supplied external identifier, the source system 32 may receive from the provider system (e.g., 34a) a confirmation that the provider system (e.g., 34a) has suppressed the designated duplicate listing.

In one example, the request by the source system 32 to suppress the designated duplicate listing on the provider system (e.g., 34a) may be transmitted to the provider system using an application programming interface (API). Using the application programming interface (API), the source system 32 may receive the acknowledgement and the confirmation from the provider system (e.g., 34a). In another example, the source system 32 may transmit the request to suppress the designated duplicate listing on the provider system (e.g., 34a) using a first feed. The acknowledgement may be received by the source system 32 from the provider system (e.g., 34a) using the first feed. The source system 32 may receive the confirmation from the provider system (e.g., 34a) using a second feed.

In an example, in response to the source system 32 receiving from the provider system (e.g., 34a) the confirmation that the provider system (e.g., 34a) has suppressed the designated duplicate listing, the source system 32 may verify that the designated duplicate listing has been suppressed on the provider system (e.g., 34a). In one example, verifying that the designated duplicate listing has been suppressed on the provider system (e.g., 34a) may comprise the source system 32 visiting the address provided by a universal resource locator (URL) associated with the designated duplicate listing on the provider system (e.g., 34a). In another example, verifying that the designated duplicate listing has been suppressed on the provider system (e.g., 34a) may comprise the source system 32 employing an application programming interface (API) to search the provider system (e.g., 34a) for the designated duplicate listing.

In an example, the source system 32 may receive from the provider system (e.g., 34a) an indication from the provider system (e.g., 34a) that the designated duplicate listing no longer exists on the provider system 32. In one example, the indication may be a listing not found response. In another example, the source system 32 may receive from the provider system (e.g., 34*a*) a universal resource locator redirected response comprising a universal resource locator associated with representative listing. In another example, the indication may comprise the source system 32 receiving from the provider system (e.g., 34*a*) a list of entries. The provider system 32 may determine that the list of entries does not contain the designated duplicate listing.

In an example, the source system 32 may receive from the provider system (e.g., 34*a*) a receipt file as a confirmation that the provider system (e.g., 34*a*) has suppressed the designated duplicate listing. The receipt file may comprise a record corresponding to the designated duplicate listing, the record comprising the second provider-supplied external identifier, a universal resource locator associated with the designated duplicate listing, and an indication that the designated duplicate listing is not in service on the provider system (e.g., 34*a*).

In an example, the source system 32 may receive from the provider system (e.g., 34*a*) the confirmation that the provider system (e.g., 34*a*) has suppressed the designated duplicate listing, but the source system 32 verifies that the designated duplicate listing has not been suppressed on the provider system (e.g., 34*a*). Accordingly, the source system 32 may update a record in the system database 42 associated with the potential matching listing that was designated as a duplicate listing with an indication that the potential matching listing has not been suppressed on the provider system (e.g., 34*a*). The provider system 32 may re-transmit to the provider system (e.g., 34*a*) the request to suppress the designated duplicate listing on the provider system (e.g., 34*a*). The request may comprise the second provider-supplied external identifier.

In another example, the source system 32 may update in the database 42 associated with the source system 32, a record associated with the potential matching listing to indicate the request to suppress the designated duplicate listing was transmitted to the provider system (e.g., 34*a*), confirmed as suppressed by the provider system (e.g., 34*a*), but not verified by the source system 32 as suppressed on the provider system (e.g., 34*a*).

In one example, the source system 32 may assign a confidence score to a potential matching listing. The confidence score may be based the one or more fields of the identification data associated with the potential matching listing. In one example, responsive to the source system 32 assigning the confidence score to the potential matching listing equal to or above a first threshold value, the source system may mark the potential matching listing as a confirmed matching listing. The source system 32 may perform the designation of the potential matching listing as the duplicate listing. In one example, responsive to the source system 32 assigning the confidence score to the potential matching listing lower a second threshold value below the threshold first value, the source system 32 may discard for further consideration the potential matching listing as non-matching listing. In one example, responsive to the source system 32 assigning the confidence score to the potential matching listing equal to or above a second threshold value below the first threshold value, the source system 32 may mark the potential matching listing as a probable matching listing.

In one example, responsive to the source system designating the potential matching listing as probable matching listing, the source system 32 may present the probable matching listing to at least one of a user associated with the entity (e.g., the merchant 38) or a human operator 40 associated with the source system 32. The source system 32 may receive from the at least one of the user associated with the entity (e.g., the merchant 38) or the human operator 40 associated with the source system 32, a designation of the probable matching listing as a non-matching listing. The source system 32 may mark in the database 42 associated with the source system 32, a record associated with the potential matching listing with an indication that the potential matching listing is a non-matching listing. The source system 32 may be operable to remove the non-matching listing from future consideration in searches for duplicate listings.

In one example, the source system 32 may receive from at least one of the user associated with the entity (e.g., the merchant 38) or the human operator 40 associated with the source system 32, a designation of the probable matching listing as a confirmed matching listing. The source system 32 may mark in the database 42 associated with the source system 32, the record associated with the potential matching listing with an indication that the potential matching listing is a confirmed matching listing. The source system 32 may perform the designation of the potential matching listing as the duplicate listing.

In one example, the source system 32 may periodically repeat the aforementioned searching, receiving a potential matching listing, designating, and transmitting to further identify and suppress duplicate listings on the provider system (e.g., 34*a*) in view of the first identification data of the representative listing. In one example, the periodic repeating may be performed automatically by the source system 32. In another example, the periodic repeating may be initiated by at least one of the user associated with the entity (e.g., the merchant 38) or the human operator 40 associated with the source system 32.

In one example, the provider system (e.g., 34*a*) may be one of a plurality of provider systems 34*a*-34*n* associated with the source system 32. Accordingly, the provider system 32 may periodically repeat the aforementioned searching, receiving a potential matching listing, designating, and transmitting to further identify and suppress duplicate listings on the remainder of the plurality of provider systems 34*a*-34*n* in view of said extracted identification data of the representative listing.

Figure 14:
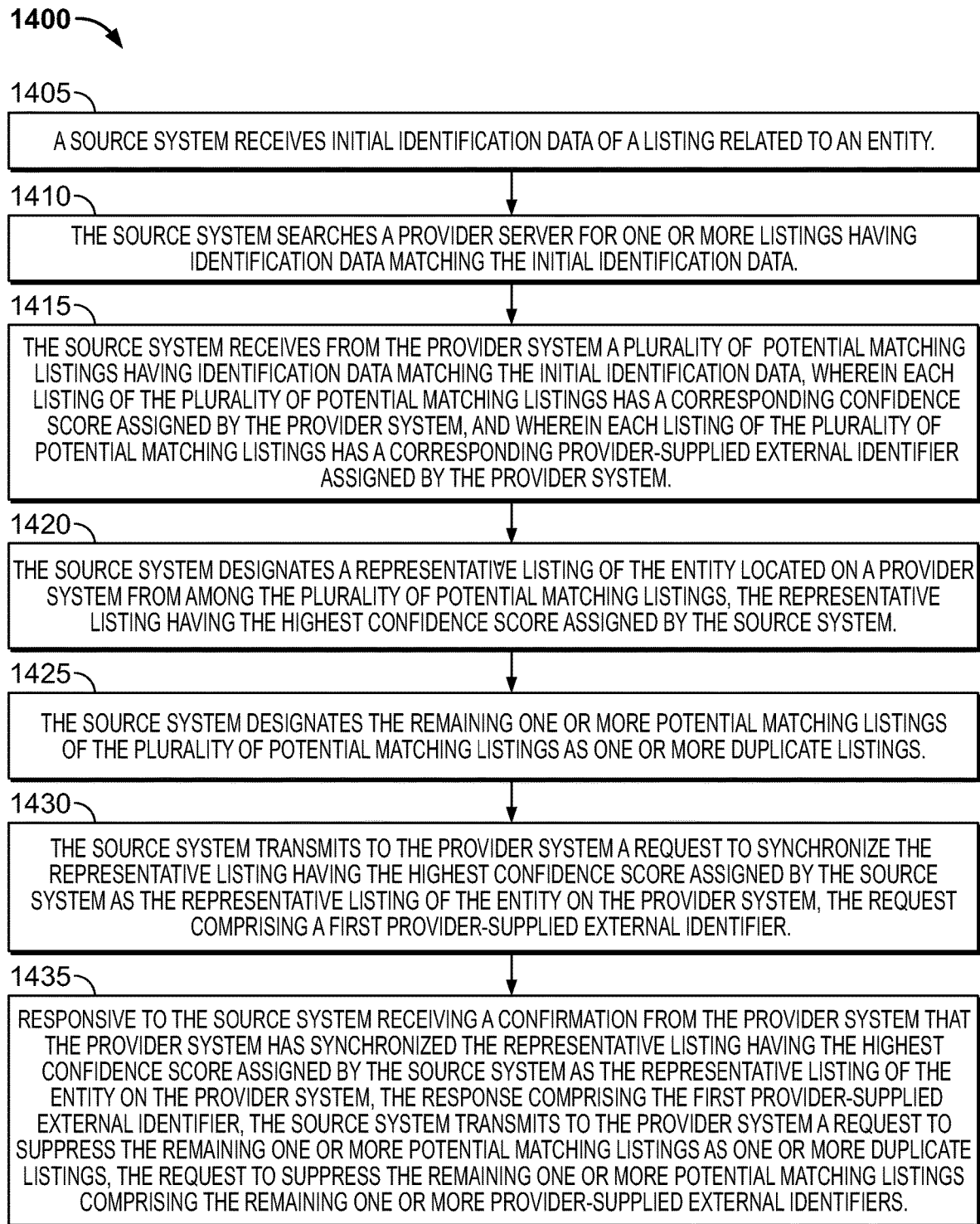
FIG. 14 is a flow diagram illustrating an example of a method for suppressing a duplicate listing by first determining a representative (synchronized) listing on a provider system from a source system and then designating any other corresponding listings for a location as duplicate listings.

FIG. 14 is a flow diagram illustrating an example of a method 1400 for suppressing a duplicate listing by first determining a representative (synchronized) listing on a provider system (e.g., 34*a*) from a source system 32 and then designating any other corresponding listings for a location as duplicate listings. The method 1400 may be performed by the source system 32 of FIG. 4 and may comprise hardware (e.g., circuitry, dedicated logic, programmable logic, microcode, etc.), software (e.g., instructions run on a processing device), or a combination thereof. In one example, the method 1400 may be performed by processing logic (not shown) of the source system 32 of FIG. 4.

As shown in FIG. 14, at block 1405, the source system 32 may receive from a user associated with an entity (e.g., the merchant 38) initial identification data of a listing related to the entity (e.g., a business, an organization, a government agency, etc.). At block 1410, the source system may search a provider system (e.g., 34*a*) for one or more listings having identification data matching the initial identification data. At block 1415, the source system 32 may receive from the provider system (e.g., 34*a*) a plurality of potential matching listings having identification data matching the initial identification data. Each listing of the plurality of potential matching listings may have a corresponding confidence score assigned by the source system 32. Each listing of the plurality of potential matching listings may have a corresponding provider-supplied external identifier assigned by the provider system (e.g., 34a). At block 1420, the source system 32 may designate a representative listing of the entity located on a provider system (e.g., 34a) from among the plurality of potential matching listings. The representative listing may be the listing having the highest confidence score assigned by the source system 32. At block 1425, the source system 32 may designate the remaining one or more potential matching listings of the plurality of potential matching listings as one or more duplicate listings. At block 1430, the source system 32 may transmit to the provider system (e.g., 34a) a request to synchronize the representative listing having the highest confidence score assigned by the source system 32 as the representative listing of the entity on the provider system (e.g., 34a). The request may comprise a first provider-supplied external identifier.

At block 1435, responsive to the source system 32 receiving a confirmation from the provider system (e.g., 34a) that the provider system (e.g., 34a) has synchronized the representative listing having the highest confidence score assigned by the source system 32 as the representative listing of the entity on the provider system (e.g., 34a), the response comprising the first provider-supplied external identifier, the source system 32 may transmit to the provider system (e.g., 34a) a request to suppress the remaining one or more potential matching listings as one or more duplicate listings. The request to suppress the remaining one or more potential matching listings may comprise the remaining one or more provider-supplied external identifiers.

In one example, before transmitting the request to suppress the remaining one or more potential matching listings, the source system 32 may verify that a plurality of fields associated with the confirmed representative listing are correct. Verifying that the fields of the plurality of fields associated with the confirmed representative listing are correct may comprise the source system 32 transmitting to the provider system (e.g., 34a) identification data associated with the confirmed representative listing of the entity on the provider system (e.g., 34a). The source system 32 may receive from the provider system (e.g., 34a) the fields of the plurality of fields associated with the confirmed representative listing on a display (not shown). The source system 32 may obtain a screen shot of the display (not shown). The source system 32 may extract the fields of the plurality of fields from the screen shot. The source system may verify that the extracted fields are correct.

In an example, verifying that the fields of the plurality of fields associated with the confirmed representative listing are correct may comprise the source system 32 transmitting to the provider system (e.g., 34a) identification data associated with the confirmed representative listing of the entity on the provider system (e.g., 34a) using an application programming interface (API). The identification data may comprise the first provider-supplied external identifier. The source system 32 may receive from the provider system (e.g., 34a) the fields of the plurality of fields associated with the confirmed representative listing in a response from the application programming interface. The source system 32 may verify that the fields in the response from the application programming interface are correct.

In an example, before the request to suppress the remaining one or more potential matching listings, the source system 32 may update in the database 42 associated with the source system 32, a record associated with the listing having the highest confidence score with an indication that the listing having the highest confidence score is the representative listing of the entity located on a provider system (e.g., 34a). The indication may comprise the first provider-supplied external identifier.

In an example, the request to synchronize the representative listing having the highest confidence score may be transmitted by the source system 32 to the provider system (e.g., 34a) using an application programming interface. An acknowledgement to accept the request to synchronize the representative listing having the highest confidence score may be received by the source system 32 from the provider system (e.g., 34a) using an application programming interface. The confirmation that the provider system (e.g., 34a) has synchronized the representative listing may be received by the source system 32 from the provider system (e.g., 34a) using the application programming interface.

In an example, the request to synchronize the representative listing having the highest confidence score may be transmitted by the source system 32 to the provider system (e.g., 34a) using a first feed. An acknowledgement to accept the request to synchronize the representative listing having the highest confidence score may be received by the source system 32 from the provider system (e.g., 34a) using the first feed. The confirmation that the provider system 32 has synchronized the representative listing may be received by the source system 32 from the provider system (e.g., 34a) using a second feed.

In one example, the source system 32 may update in the database 42 associated with the source system 32, one or more records associated with the one or more remaining potential matching listings with corresponding one or more indications that the one or more remaining potential matching listings are one or more duplication listings on the provider system (e.g., 34a). The one or more indications may comprise the corresponding remaining one or more provider-supplied external identifiers.

In an example, responsive to the source system 32 receiving an acknowledgement from the provider system (e.g., 34a) that the provider system (e.g., 34a) has accepted the request to suppress the remaining one or more potential matching listings as one or more duplicate listings, the source system 32 may receive from the provider system (e.g., 34a) at least one confirmation that the provider system (e.g., 34a) has suppressed the remaining one or more potential matching listings as one or more duplicate listings. The at least one confirmation may comprise the corresponding remaining one or more provider-supplied external identifiers.

In one example, the request to suppress the remaining one or more potential matching listings as one or more duplicate listings may be transmitted from the source system 32 to the provider system (e.g., 34a) using an application programming interface. At least one confirmation that the provider system (e.g., 34a) has suppressed the remaining one or more potential matching listings as one or more duplicate listings may be received by the source system 32 from the provider system (e.g., 34a) using the application programming interface.

In one example, the request to suppress the remaining one or more potential matching listings as one or more duplicate listings may be transmitted from the source system 32 to the provider system (e.g., 34a) using a first feed. The acknowledgement to accept the request to suppress the remaining one or more potential matching listings as one or more duplicate listings may be received by the source system 32 from the provider system (e.g., 34a) using the first feed. The confirmation that the provider system (e.g., 34a) has suppressed the remaining one or more potential matching listings as one or more duplicate listings may be received by the source system 32 from the provider system (e.g., 34*a*) using a second feed.

In one example, responsive to the source system 32 receiving from the provider system (e.g., 34*a*) the at least one confirmation that the provider system (e.g., 34*a*) has suppressed the remaining one or more potential matching listings as one or more designated duplicate listings, the source system 32 may verify on the provider system (e.g., 34*a*) that the one or more designated duplicate listings have been suppressed on the provider system (e.g., 34*a*). In one example, the source system 32 verifying that the remaining one or more potential matching listings have been suppressed on the provider system (e.g., 34*a*) may comprise, after transmitting the request to suppress the remaining one or more potential matching listings, transmitting to the provider system (e.g., 34*a*) the corresponding remaining one or more provider-supplied external identifiers.

In one example, verifying may comprise visiting, by the source system 32 on the provider system (e.g., 34*a*), the corresponding one or more universal resource locators (URL) associated with the one or more designated duplicate listings. In one example, verifying may comprise the source system 32 employing an application programming interface (API) to search the provider system (e.g., 34*a*) for the one or more designated duplicate listings.

In one example, verifying may comprise the source system 32 receiving one or more corresponding indications from the provider system (e.g., 34*a*) that the one or more designated duplicate listings no longer exist on the provider system (e.g., 34*a*). The one or more corresponding indications may be one or more listing not found responses. In an example, verifying may comprise the source system 32 receiving from the provider system (e.g., 34*a*) one or more corresponding universal resource locator redirected responses comprising one or more universal resource locators associated with representative listing. In one example, verifying may comprise the source system 32 receiving from the provider system (e.g., 34*a*) a list of entries corresponding to a search results page. The source system may determine that the list of entries does not contain the one or more remaining listings.

In one example, the source system 32 may assign a confidence score to a potential matching listing. The confidence score may be based the one or more fields of the identification data associated with the potential matching listing. In one example, responsive to the source system 32 assigning the confidence score to the potential matching listing equal to or above a first threshold value, the source system may mark the potential matching listing as a confirmed matching listing. The source system 32 may perform the designation of the potential matching listing as the duplicate listing. In one example, responsive to the source system 32 assigning the confidence score to the potential matching listing lower than a second threshold value below the threshold first value, the source system 32 may discard for further consideration the potential matching listing as non-matching listing. In one example, responsive to the source system 32 assigning the confidence score to the potential matching listing equal to or above a second threshold value below the first threshold value, the source system may mark the potential matching listing as a probable matching listing.

In one example, responsive to the source system designating the potential matching listing as probable matching listing, the source system 32 may present the probable matching listing to at least one of a user associated with the entity (e.g., the merchant 38) or a human operator 40 associated with the source system 32. The source system 32 may receive from the at least one of the user associated with the entity (e.g., the merchant 38) or the human operator 40 associated with the source system 32, a designation of the probable matching listing as a non-matching listing. The source system 32 may mark in the database 42 associated with the source system 32, a record associated with the potential matching listing with an indication that the potential matching listing is a non-matching listing. The source system 32 may be operable to remove the non-matching listing from future consideration in searches for duplicate listings.

In one example, the source system 32 may receive from at least one of the user associated with the entity (e.g., the merchant 38) or the human operator 40 associated with the source system 32, a designation of the probable matching listing as a confirmed matching listing. The source system 32 may mark in the database 42 associated with the source system 32, the record associated with the potential matching listing with an indication that the potential matching listing is a confirmed matching listing. The source system 32 may perform the designation of the potential matching listing as the duplicate listing.

In one example, the source system 32 may periodically repeat the aforementioned searching a provider system, receiving a plurality of potential matching listings, designating a representative listing, designating the remaining one or more potential matching listings as one or more duplicate listings, transmitting a request to synchronize the representative listing, and transmitting a request to suppress the remaining one or more potential matching listings as one or more duplicate listings to further identify and suppress duplicate listings on the provider system (e.g., 34*a*) in view of the first identification data of the representative listing. In one example, the periodic repeating may be performed automatically by the source system 32. In another example, the periodic repeating may be initiated by at least one of the user associated with the entity (e.g., the merchant 38) or the human operator 40 associated with the source system 32.

In one example, the provider system (e.g., 34*a*) may be one of a plurality of provider systems 34*a*-34*n* associated with the source system 32. Accordingly, the provider system 32 may periodically repeat the aforementioned searching a provider system, receiving a plurality of potential matching listings, designating a representative listing, designating the remaining one or more potential matching listings as one or more duplicate listings, transmitting a request to synchronize the representative listing, and transmitting a request to suppress the remaining one or more potential matching listings as one or more duplicate listings to further identify and suppress duplicate listings on the remainder of the plurality of provider systems 34*a*-34*n* in view of said extracted identification data of the representative listing.

Figure 15:
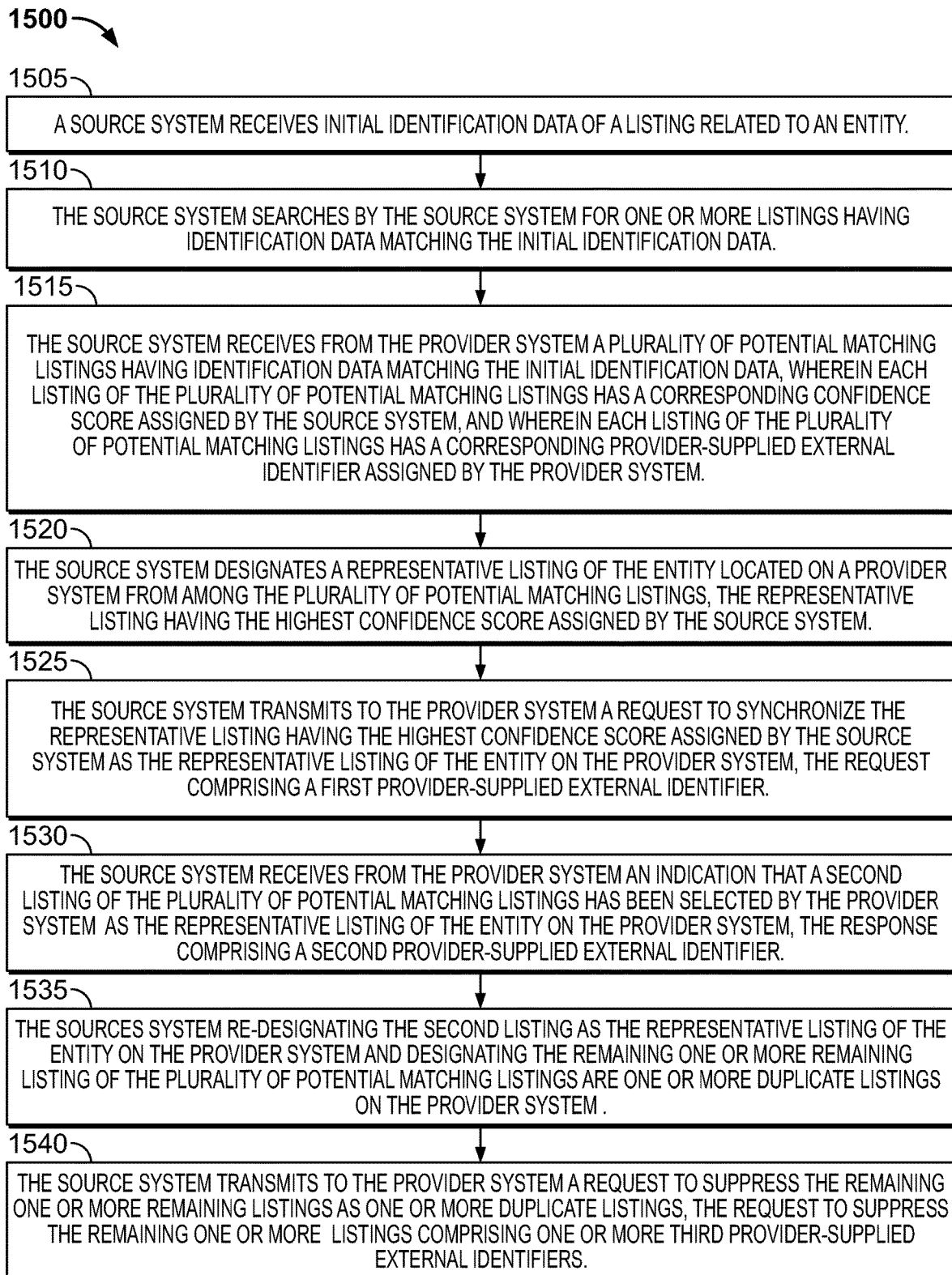
FIG. 15 is a flow diagram illustrating an example of a method for suppressing a duplicate listing by first determining a representative (synchronized) listing on a provider system and designating any other corresponding listings for a location as duplicate listings, but the provider system selects a different listing as the synchronized listing rather than the one selected by the source system.

FIG. 15 is a flow diagram illustrating an example of a method 1500 for suppressing a duplicate listing by first determining a representative (synchronized) listing on a provider system (e.g., 34*a*) and designating any other corresponding listings for a location as duplicate listings, but the provider system (e.g., 34*a*) selects a different listing as the synchronized listing rather than the one selected by the source system 32. The method 1500 may be performed by the source system 32 of FIG. 4 and may comprise hardware (e.g., circuitry, dedicated logic, programmable logic, microcode, etc.), software (e.g., instructions run on a processing device), or a combination thereof. In one example, the method 1500 may be performed by processing logic (not shown) of the source system 32 of FIG. 4.

As shown in FIG. 15, at block 1505, the source system 32 may receive initial identification data of a listing related to an entity. At block 1510, the source system 32 may search a provider system (e.g., 34a) for one or more listings having identification data matching the initial identification data. At block 1515, the source system 32 may receive from the provider system (e.g., 34a) a plurality of potential matching listings having identification data matching the initial identification data. Each listing of the plurality of potential matching listings may have a corresponding confidence score assigned by the source system 32. Each listing of the plurality of potential matching listings may have a corresponding provider-supplied external identifier assigned by the provider system (e.g., 34a). At block 1520, the source system may designate a representative listing of the entity located on a provider system (e.g., 34a) from among the plurality of potential matching listings. The representative listing may be the listing having the highest confidence score assigned by the source system 32. At block 1525, the source system may transmit to the provider system (e.g., 34a) a request to synchronize the representative listing having the highest confidence score assigned by the source system 32 as the representative listing of the entity on the provider system (e.g., 34a). The request may comprise a first provider-supplied external identifier. At block 1530, the source system may receive from the provider system (e.g., 34a) an indication that a second listing of the plurality of potential matching listings has been selected by the provider system (e.g., 34a) as the representative listing of the entity on the provider system (e.g., 34a). The response may comprise a second provider-supplied external identifier. At block 1535, the source system may re-designate the second listing as the representative listing of the entity on the provider system (e.g., 34a) and may designate the remaining one or more remaining listing of the plurality of potential matching listings as one or more duplicate listings on the provider system (e.g., 34a). At block 1540, the source system 32 may transmit to the provider system (e.g., 34a) a request to suppress the remaining one or more listings as one or more duplicate listings. The request to suppress the remaining one or more listings may comprise one or more third provider-supplied external identifiers.

In one example, the source system 32 may update in a database 42 associated with the source system 32, a record associated with the second listing with an indication that the second listing is the representative listing of the entity located on a provider system (e.g., 34a), the indication comprising the second provider-supplied external identifier. The source system 32 may update one or more records associated with one or more indications that the one or more remaining listings of the plurality of potential matching listings are one or more duplicate listings on the provider system (e.g., 34a), the one or more indications comprising the one or more third provider-supplied external identifiers.

In an example, responsive to the source system 32 receiving an acknowledgement from the provider system (e.g., 34a) that the provider system (e.g., 34a) has accepted the request to suppress the one or more remaining listings as one or more duplicate listings, the source system 32 may receive from the provider system (e.g., 34a) at least one confirmation that the provider system (E.g., 34a) has suppressed the one or more remaining listings as one or more duplicate listings, the at least one confirmation comprising the corresponding remaining one or more third provider-supplied external identifiers.

In one example, the request to suppress the one or more remaining listings as one or more duplicate listings may be transmitted from the source system 32 to the provider system (e.g., 34a) using an application programming interface. The at least one confirmation that the provider system (e.g., 34a) has suppressed the one or more remaining listings as one or more duplicate listings may be received by the source system 32 from the provider system (e.g., 34a) using the application programming interface.

In one example, the request to suppress the one or more remaining listings as one or more duplicate listings may be transmitted from the source system 32 to the provider system (e.g., 34a) using a first feed. The acknowledgement to accept the request to suppress the one or more remaining listings as one or more duplicate listings may be received by the source system 32 from the provider system (e.g., 34a) using the first feed. The at least one confirmation that the provider system (e.g., 34a) has suppressed the one or more remaining listings as one or more duplicate listings may be received by the source system 32 from the provider system (e.g., 34a) using a second feed.

In an example, responsive to the source system 32 receiving from the provider system (e.g., 34a), the at least one confirmation that the provider system (e.g., 34a) has suppressed the remaining one or more potential matching listings as one or more designated duplicate listings, the source system 32 may verify on the provider system (e.g., 34a) that the one or more designated duplicate listings have been suppressed on the provider system (e.g., 34a). In an example, responsive to the source system 32 receiving from the provider system (e.g., 34a) the confirmation that the provider system (e.g., 34a) has suppressed the one or more remaining listings as one or more duplicate listings, the source system 32 may verify on the provider system (e.g., 34a) that the one or more remaining listings as one or more duplicate listings have been suppressed on the provider system (e.g., 34a).

In one example, verifying that the one or more remaining listings as one or more duplicate listings have been suppressed on the provider system (e.g., 34a) may comprise, after the source system 32 transmits the request to suppress the one or more remaining listings as one or more duplicate listings, transmitting to the provider system (e.g., 34a) the corresponding one or more third provider-supplied external identifiers.

In one example, verifying that the one or more remaining listings as one or more duplicate listings have been suppressed on the provider system (e.g., 34a) may comprise visiting, by the source system 32 on the provider system (e.g., 34a), the corresponding one or more universal resource locators (URL) associated with the one or more remaining listings. In one example, the verifying may comprise employing, by the source system 32, an application programming interface (API) to search the provider system (e.g., 34a) for the one or more remaining listings. In one example, the verifying may comprise the source system 32 receiving one or more corresponding indications from the provider system (e.g., 34a) that the one or more remaining listings no longer exist on the provider system (e.g., 34a).

In one example, the one or more corresponding indications may be one or more listing not found responses.

In one example, verifying may comprise receiving, by the source system 32 from the provider system (e.g., 34a), one or more corresponding universal resource locator redirected responses comprising one or more universal resource locators associated with the representative listing. In one example, verifying may comprise receiving, by the source system 32 from the provider system (e.g., 34*a*), a list of entries corresponding to a search results page. The source system 32 may determine that the list of entries does not contain the one or more remaining listings.

FIG. 16 is a flow diagram illustrating an example of a method 1600 for suppressing a duplicate listing in response to a human triggering a suppression of a list of no longer valid listings on a plurality of provider systems 34*a*-34*n*. The method 1600 may be performed by the source system 32 of FIG. 4 and may comprise hardware (e.g., circuitry, dedicated logic, programmable logic, microcode, etc.), software (e.g., instructions run on a processing device), or a combination thereof. In one example, the method 1600 may be performed by processing logic (not shown) of the source system 32 of FIG. 4.

As shown in FIG. 16, at block 1605, the source system 32 may receive from at least one of the user associated with an entity (e.g., the merchant 38) or the human operator 40 associated with the source system 32, an indication to suppress all listings associated with the entity on one or more provider systems 34*a*-34*n*. The indication may comprise identification data of the entity and an indication that the identification data of the entity is no longer valid. At block 1610, the source system 32 may retrieve from a database 42 associated with the source system 32, a list of one or more provider systems 34*a*-34*n* associated with the source system 32 and having at least one listing corresponding to the entity.

For each provider system in the list of one or more provider systems: at block 1615, the source system 32 may search the provider system (e.g., 34*a*) for listings having identification data matching the identification data of the entity. At block 1620, the source system 32 may receive from the provider system (e.g., 34*a*), one or more matching listings having identification data matching the identification data of the entity. Each listing of the one or more matching listings may have a corresponding provider-supplied external identifier assigned by the provider system (e.g., 34*a*). At block 1625, the source system 32 may transmit to the provider system (e.g., 34*a*) a request to suppress the one or more matching listings on the provider system (e.g., 34*a*). The request to suppress the one or more matching listings may comprise a list of the one or more corresponding provider-supplied external identifiers.

In an example, responsive to the source system 32 receiving an acknowledgement from the provider system (e.g., 34*a*) that the provider system (e.g., 34*a*) has accepted the request to suppress the one or more matching listings in view of the one or more corresponding provider-supplied external identifiers, the source system 32 may receive from the provider system (e.g., 34*a*) a confirmation that the provider system (e.g., 34*a*) has suppressed the one or more matching listings.

In one example, the request may be transmitted from the source system 32 to the provider system (e.g., 34*a*) using an application programming interface. The acknowledgement and the confirmation may be received by the source system 32 from the provider system (e.g., 34*a*) using the application programming interface.

In an example, the request may be transmitted from the source system 32 to the provider system (e.g., 34*a*) using a first feed. The acknowledgement may be received by the source system 32 from the provider system (e.g., 34*a*) using the first feed. The confirmation may be received by the source system 32 from the provider system (e.g., 34*a*) using a second feed.

In an example, responsive to the source system 32 receiving from the provider system (e.g., 34*a*) the confirmation that the provider system (e.g., 34*a*) has suppressed the remaining one or more potential matching listings as one or more designated duplicate listings, the source system 32 may verify on the provider system (e.g., 34*a*) that the one or more designated duplicate listings have been suppressed on the provider system (e.g., 34*a*). In an example, verifying that the one or more designated duplicate listings have been suppressed on the provider system (e.g., 34*a*) may comprise, after the source system 32 transmits the request to the provider system (e.g., 34*a*) to suppress the one or more matching listings, transmitting to the provider system (e.g., 34*a*) the list of the one or more corresponding provider-supplied external identifiers. In one example, verifying that the one or more designated duplicate listings have been suppressed on the provider system (e.g., 34*a*) may comprise the source system 34*a* visiting on the provider system (e.g., 34*a*), the one or more universal resource locators (URL) associated with the one or more matching listings. In one example, verifying that the one or more designated duplicate listings have been suppressed on the provider system (e.g., 34*a*) may comprise employing, by the source system 32, an application programming interface (API) to search the provider system (e.g., 34*a*) for the one or more matching listings. In an example, verifying that the one or more designated duplicate listings have been suppressed on the provider system (e.g., 34*a*) may comprise the source system 32 receiving an indication from the provider system (e.g., 34*a*) that the one or more matching listings no longer exist on the provider system (e.g., 34*a*).

In an example, the indication may be one or more listing not found responses. In one example, verifying that the one or more designated duplicate listings have been suppressed on the provider system (e.g., 34*a*) may comprise the source system 32 receiving from the provider system (e.g., 34*a*) a search results page. The source system 32 may determine that the search results page does not contain the one or more matching listings.

In an example, the source system 32 receiving a confirmation that the provider system (e.g., 34*a*) has suppressed the one or more matching listings may comprise receiving a receipt file. The receipt file may comprise one or more records corresponding to the one or more matching listings. Each record of the one or more records may comprise a provider-supplied external identifier associated a corresponding matching listing, a universal resource locator associated with the corresponding matching listing, and an indication that the corresponding matching listing is not in service on the provider system (e.g., 34*a*).

In one example, the source system 32 may receive from at least one of the user associated with an entity (e.g., the merchant 38) or the human operator 40 associated with the source system 32, identification data of a replacement entity for delivery of an enhanced listing to a plurality of provider systems 34*a*-34*n*. For each provider system (e.g., 34*a*) of the plurality of provider systems 34*a*-34*n*: the source system 32 may transmit to the provider system (e.g., 34*a*) identification data of the replacement entity and the enhanced listing to the provider system (e.g., 34*a*) without a provider-supplied external identifier as an indication to the provider system (e.g., 34*a*) to create a listing using the enhanced content.

Figure 17:
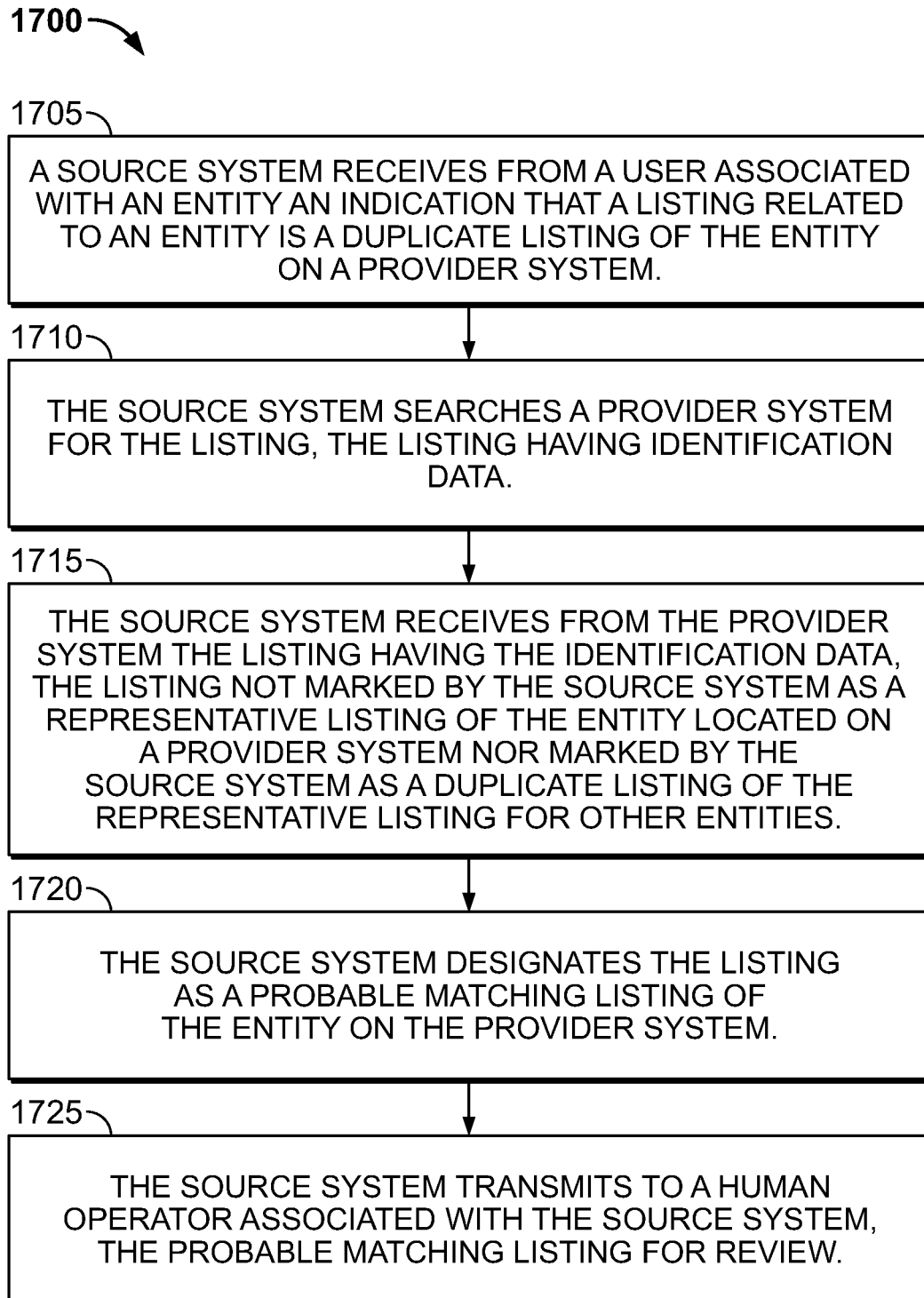
FIG. 17 is a flow diagram illustrating an example of a method for suppressing a duplicate listing on a plurality of provider systems.

FIG. 17 is a flow diagram illustrating an example of a method 1700 for suppressing a duplicate listing on a plurality of provider systems 34*a*-34*n*. The method 1700 may be performed by the source system 32 of FIG. 4 and may comprise hardware (e.g., circuitry, dedicated logic, programmable logic, microcode, etc.), software (e.g., instructions run on a processing device), or a combination thereof. In one example, the method 1700 may be performed by processing logic (not shown) of the source system 32 of FIG. 4.

As shown in FIG. 17, at block 1705, the source system 32 may receive from a user associated with an entity (e.g., a merchant 38), an indication that a listing related to an entity is a duplicate listing of the entity on a provider system (e.g., 34*a*). At block 1710, the source system 32 may search the provider system (e.g., 34*a*) for the listing, the listing having identification data. At block 1715, the source system 32 may receive from the provider system (e.g., 34*a*) the listing having the identification data. The listing may not be marked by the source system 32 as a representative listing of the entity located on a provider system (e.g., 34*a*), nor be marked by the source system 32 as a duplicate listing of the representative listing for other entities. At block 1720, the source system may designate the listing as a probable matching listing of the entity on the provider system (e.g., 34*a*). At block 1725, the source system may transmit to a human operator 40 associated with the source system 32, the probable matching listing for review.

In one example, the human operator 40 may employ the source system 32 to search the provider system (e.g., 34*a*) for the probable matching listing. The human operator 40 associated with the source system 32 may receive an indication that the probable matching listing does not exist on the provider system. The source system 32 may receive from the human operator 38 associated with the source system 32, an indication of a rejection of the probable matching listing as the listing of the entity on the provider system (e.g., 34*a*). The source system 32 may transmit to the user associated with an entity (e.g., the merchant 38) the indication of the rejection.

In one example, the human operator 40 associated with the source system 32 may search the database 42 associated with the provider system 32 for the probable matching listing. The human operator 40 associated with the source system 32 may receive from the source system 32, an indication that the probable matching listing exits on the provider system (e.g., 34*a*). The probable matching listing may be marked on the provider system (e.g., 34*a*) as a representative listing or a duplicate listing associated with another entity on the provider system (e.g., 34*a*). The source system 32 may receive from the human operator 40 associated with the source system 32, an indication of a rejection of the probable matching listing as the listing of the entity on a provider system (e.g., 34*a*). The source system 32 may transmit to the user associated with an entity (e.g., the merchant 38), the indication of the rejection.

In one example, the human operator 40 associated with the source system 32 may search the provider system (e.g., 34*a*) for the probable matching listing. The human operator 38 associated with the source system 32 may receive from the source system 32, an indication that the probable matching listing exits on the provider system (e.g. 34*a*). The probable matching listing may be neither marked on the provider system (e.g., 34*a*) as a representative listing nor be marked as duplicate listing associated with another entity on the provider system (e.g., 34*a*). The source system 32 may receive from the human operator 40 associated with the source system 32, an indication of a rejection of the probable matching listing as the listing of the entity on a provider system (e.g., 34*a*). The source system 32 may transmit to the user associated with an entity (e.g., the merchant 38), the indication of the rejection.

Figure 18:
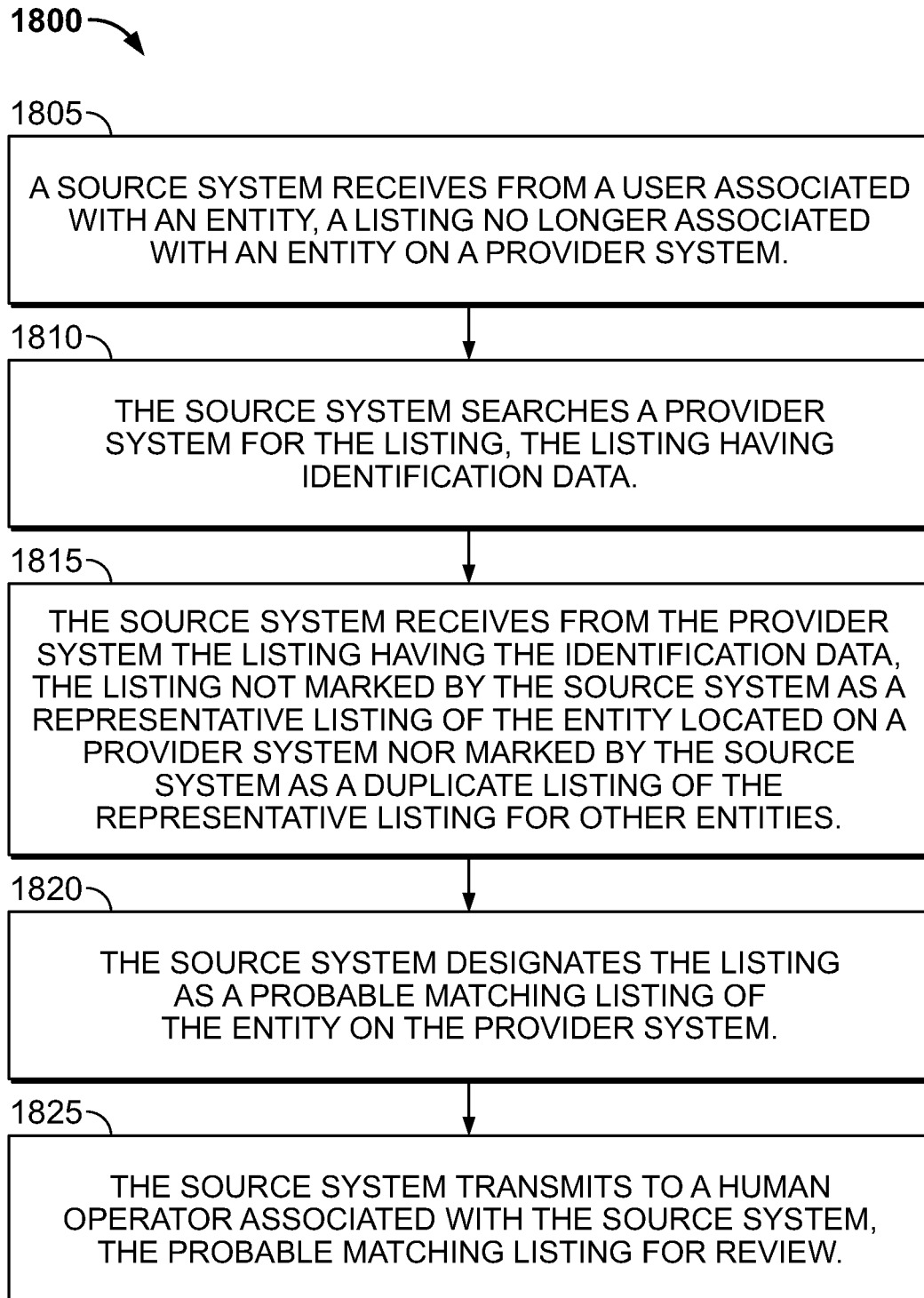
FIG. 18 is a flow diagram illustrating an example of a method for suppressing a duplicate listing on a plurality of provider systems.

FIG. 18 is a flow diagram illustrating an example of a method 1800 for suppressing a duplicate listing on a plurality of provider systems 34*a*-34*n*. The method 1800 may be performed by the source system 32 of FIG. 4 and may comprise hardware (e.g., circuitry, dedicated logic, programmable logic, microcode, etc.), software (e.g., instructions run on a processing device), or a combination thereof. In one example, the method 1800 may be performed by processing logic (not shown) of the source system 32 of FIG. 4.

As shown in FIG. 18, at block 1805, the source system 32 may receive from a user associated with an entity (e.g., the merchant 38), a listing no longer associated with an entity on a provider system (e.g., 34*a*). At block 1810, the source system 32 may search the provider system (e.g., 34*a*) for the listing, the listing having identification data. At block 1815, the source system 32 may receive from the provider system (e.g., 34*a*), the listing having the identification data. The listing may not be marked by the source system 32 as a representative listing of the entity located on a provider system (e.g., 34*a*) nor be marked by the source system 32 as a duplicate listing of the representative listing for other entities. At block 1820, the source system may designate the listing as a probable matching listing of the entity on the provider system (e.g., 34*a*). At block 1825, the source system 32 may transmit to a human operator 40 associated with the source system 32, the probable matching listing for review.

In one example, the human operator 40 associated with the source system 32 may employ the source system 32 to search the provider system (e.g., 34*a*) for the probable matching listing. The human operator 40 associated with the source system 32 may receive an indication that the probable matching listing does not exist on the provider system (e.g., 34*a*). The source system 32 may receive from the human operator 40 associated with the source system 32, an indication of a rejection of the probable matching listing as the listing of the entity on the provider system (e.g., 34*a*). The source system 32 may transmit to the user associated with an entity (e.g., the merchant 38), the indication of the rejection.

In one example, the human operator 40 associated with the source system may employ the source system 32 to search the provider system (e.g., 34*a*) for the probable matching listing. The human operator 38 associated with the source system 32 may receive an indication that the probable matching listing exits on the provider system (e.g., 34*a*). The probable matching listing may be marked on the provider system (e.g., 34*a*) as a representative listing or a duplicate listing associated with another entity on the provider system (e.g., 34*a*). The source system 32 may receive from the human operator 40 associated with the source system 32, an indication of a rejection of the probable matching listing as the listing of the entity on a provider system (e.g., 34*a*). The source system 32 may transmit to the user associated with an entity (e.g., the merchant 38), the indication of the rejection.

In an example, the human operator 38 associated with the source system 32 may employ the source system 32 to search the provider system (e.g., 34*a*) for the probable matching listing. The human operator 38 associated with the source system 32 may receive an indication that the probable matching listing exits on the provider system (e.g., 34*a*). The probable matching listing may neither be marked on the provider system (e.g., 34*a*) as a representative listing, nor be marked as duplicate listing associated with another entity on the provider system (e.g., 34*a*). The source system 32 may receive from the human operator 40 associated with the source system 32 an indication of a rejection of the probable matching listing as the listing of the entity on a provider system (e.g., 34a). The source system 32 may transmit to the user associated with an entity (e.g., the merchant 38) the indication of the rejection.

Figure 19:
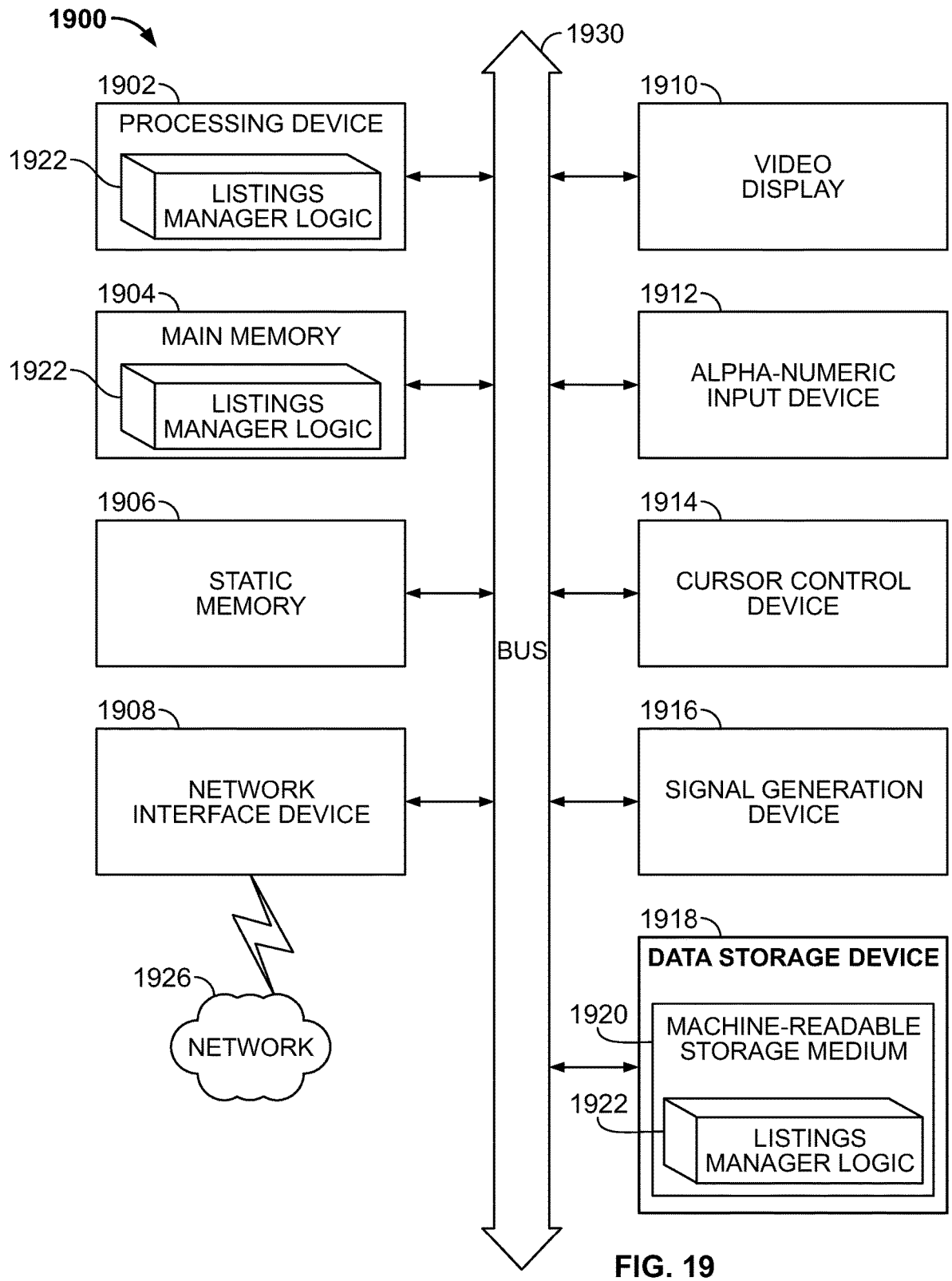
FIG. 19 illustrates a diagrammatic representation of a machine in the exemplary form of a computer system within which a set of instructions, for causing the machine to perform any one or more of the methodologies discussed herein, may be executed.

FIG. 19 illustrates a diagrammatic representation of a machine in the exemplary form of a computer system 1900 within which a set of instructions, for causing the machine to perform any one or more of the methodologies discussed herein, may be executed. In alternative embodiments, the machine may be connected (e.g., networked) to other machines in a local area network (LAN), an intranet, an extranet, or the Internet. The machine may operate in the capacity of a server or a client machine in a client-server network environment, or as a peer machine in a peer-to-peer (or distributed) network environment. The machine may be a personal computer (PC), a tablet PC, a set-top box (STB), a personal digital assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The exemplary computer system 1900 includes a processing device 1902, a main memory 1904 (e.g., read-only memory (ROM), flash memory, dynamic random access memory (DRAM) (such as synchronous DRAM (SDRAM) or Rambus DRAM (RDRAM), etc.), a static memory 1906 (e.g., flash memory, static random access memory (SRAM), etc.), and a data storage device 1918, which communicate with each other via a bus 1930.

Processing device 1902 represents one or more general-purpose processing devices such as a microprocessor, central processing unit, or the like. More particularly, the processing device may be complex instruction set computing (CISC) microprocessor, reduced instruction set computer (RISC) microprocessor, very long instruction word (VLIW) microprocessor, or processor implementing other instruction sets, or processors implementing a combination of instruction sets. Processing device 1902 may also be one or more special-purpose processing devices such as an application specific integrated circuit (ASIC), a field programmable gate array (FPGA), a digital signal processor (DSP), network processor, or the like. Processing device 1902 is configured to execute listings manager logic 1922 for performing the operations and steps discussed herein.

Computer system 1900 may further include a network interface device 1908. Computer system 1900 also may include a video display unit 1910 (e.g., a liquid crystal display (LCD) or a cathode ray tube (CRT)), an alphanumeric input device 1912 (e.g., a keyboard), a cursor control device 1914 (e.g., a mouse), and a signal generation device 1916 (e.g., a speaker).

Data storage device 1918 may include a machine-readable storage medium (or more specifically a computer-readable storage medium) 1920 having one or more sets of instructions (e.g., listing manager logic 1922) embodying any one or more of the methodologies of functions described herein. Listings manager logic 1922 may also reside, completely or at least partially, within main memory 1904 and/or within processing device 1902 during execution thereof by computer system 1900; main memory 1904 and processing device 1902 also constituting machine-readable storage media. Listings manager logic 1922 may further be transmitted or received over a network 1926 via network interface device 1908.

Machine-readable storage medium 1920 may also be used to store the device queue manager logic persistently. While machine-readable storage medium 1920 is shown in an exemplary embodiment to be a single medium, the term "machine-readable storage medium" should be taken to include a single medium or multiple media (e.g., a centralized or distributed database, and/or associated caches and servers) that store the one or more sets of instructions. The term "machine-readable storage medium" shall also be taken to include any medium that is capable of storing or encoding a set of instruction for execution by the machine and that causes the machine to perform any one or more of the methodologies of the present invention. The term "machine-readable storage medium" shall accordingly be taken to include, but not be limited to, solid-state memories, and optical and magnetic media.

The components and other features described herein can be implemented as discrete hardware components or integrated in the functionality of hardware components such as ASICs, FPGAs, DSPs or similar devices. In addition, these components can be implemented as firmware or functional circuitry within hardware devices. Further, these components can be implemented in any combination of hardware devices and software components.

Some portions of the detailed descriptions are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, as apparent from the above discussion, it is appreciated that throughout the description, discussions utilizing terms such as "enabling", "transmitting", "requesting", "identifying", "querying", "retrieving", "forwarding", "determining", "passing", "processing", "disabling", or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments of the present invention also relate to an apparatus for performing the operations herein. This apparatus may be specially constructed for the required purposes or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs and magnetic-optical disks, read-only memories (ROMs), random access memories (RAMs), EPROMs, EEPROMs, magnetic or optical cards, flash memory devices including universal serial bus (USB) storage devices (e.g., USB key devices) or any type of media suitable for storing electronic instructions, each of which may be coupled to a computer system bus.

The algorithms and displays presented herein are not inherently related to any particular computer or other apparatus. Various general purpose systems may be used with programs in accordance with the teachings herein or it may prove convenient to construct more specialized apparatus to perform the required method steps. The required structure for a variety of these systems will be apparent from the description above. In addition, the present invention is not described with reference to any particular programming language. It will be appreciated that a variety of programming languages may be used to implement the teachings of the invention as described herein.

It is to be understood that the above description is intended to be illustrative, and not restrictive. Many other embodiments will be apparent to those of skill in the art upon reading and understanding the above description. Although the present invention has been described with reference to specific exemplary embodiments, it will be recognized that the invention is not limited to the embodiments described, but can be practiced with modification and alteration within the spirit and scope of the appended claims. Accordingly, the specification and drawings are to be regarded in an illustrative sense rather than a restrictive sense. The scope of the invention should, therefore, be determined with reference to the appended claims, along with the full scope of equivalents to which such claims are entitled.

What is claimed is:

1. A method comprising:
designating, by a processing device, a first listing corresponding to a first web address as a representative listing of an entity, wherein the first listing comprises first identification data and a first provider-supplied external identifier;
searching, by the processing device, a provider system to identify a second listing associated with the entity, wherein the second listing corresponds to a second web address and wherein the second listing comprises second identification data and a second provider-supplied external identifier;
determining the second listing satisfies matching criteria associated with the first listing, wherein the matching criteria indicates that the second identification data matches the first identification data and the second provider-supplied external identifier differs from the first provider-supplied external identifier;
receiving, from a system associated with the entity, an instruction to suppress the second listing on the provider system;
transmitting, by the processing device to the provider system, a request to suppress the second listing associated with the entity; and
receiving, from the provider system, an indication that the second listing is suppressed on the provider system, wherein, in response to a request to access the second web address associated with the second listing, a web browser is redirected to the first web address associated with the first listing.

2. The method of claim 1, wherein the indication that the second listing is suppressed on the provider system is received from the provider system via an application programming interface.

3. The method of claim 1, further comprising transmitting, by the processing device, the request to access the second web address to verify redirection to the first web address.

4. The method of claim 1, further comprising receiving a file comprising the indication that the second listing is suppressed on the provider system.

5. The method of claim 1, further comprising identifying a plurality of listings associated the entity, wherein the plurality of listings comprises the first listing, and wherein each of the plurality of listings is associated with a confidence score.

6. The method of claim 5, wherein designating the first listing as the representative listing of the entity is based at least in part on a first confidence score associated with the first listing.

7. The method of claim 1, further comprising generating, by the processing device, an interface to receive, from the system associated with the entity, the instruction to suppress the second listing.

8. A system comprising:
a memory to store instructions; and
a processing device, operatively coupled to the memory, to execute the instructions to perform operations comprising:
designating a first listing corresponding to a first web address as a representative listing of an entity, wherein the first listing comprises first identification data and a first provider-supplied external identifier;
searching a provider system to identify a second listing associated with the entity, wherein the second listing corresponds to a second web address and wherein the second listing comprises second identification data and a second provider-supplied external identifier;
determining the second listing satisfies matching criteria associated with the first listing, wherein the matching criteria indicates that the second identification data matches the first identification data and the second provider-supplied external identifier differs from the first provider-supplied external identifier;
receiving, from a system associated with the entity, an instruction to suppress the second listing on the provider system;
transmitting, to the provider system, a request to suppress the second listing associated with the entity; and
receiving, from the provider system, an indication that the second listing is suppressed on the provider system, wherein, in response to a request to access the second web address associated with the second listing, a web browser is redirected to the first web address associated with the first listing.

9. The system of claim 8, wherein the indication that the second listing is suppressed on the provider system is received from the provider system via an application programming interface.

10. The system of claim 8, the operations further comprising transmitting the request to access the second web address to verify redirection to the first web address.

11. The system of claim 8, the operations further comprising receiving a file comprising the indication that the second listing is suppressed on the provider system.

12. The system of claim 8, the operations further comprising identifying a plurality of listings associated the entity, wherein the plurality of listings comprises the first listing, and wherein each of the plurality of listings is associated with a confidence score.

13. The system of claim 12, wherein designating the first listing as the representative listing of the entity is based at least in part on a first confidence score associated with the first listing.

14. The system of claim 8, the operations further comprising generating an interface to receive, from the system associated with the entity, the instruction to suppress the second listing.

15. A non-transitory computer readable storage medium including instructions that, when executed by a processing device, cause the processing device to perform operations comprising:

designating a first listing corresponding to a first web address as a representative listing of an entity, wherein the first listing comprises first identification data and a first provider-supplied external identifier;

searching a provider system to identify a second listing associated with the entity, wherein the second listing corresponds to a second web address and wherein the second listing comprises second identification data and a second provider-supplied external identifier;

determining the second listing satisfies matching criteria associated with the first listing, wherein the matching criteria indicates that the second identification data matches the first identification data and the second provider-supplied external identifier differs from the first provider-supplied external identifier;

receiving, from a system associated with the entity, an instruction to suppress the second listing on the provider system;

transmitting, to the provider system, a request to suppress the second listing associated with the entity; and receiving, from the provider system, an indication that the second listing is suppressed on the provider system, wherein, in response to a request to access the second web address associated with the second listing, a web browser is redirected to the first web address associated with the first listing.

16. The non-transitory computer readable storage medium of claim 15, wherein the indication that the second listing is suppressed on the provider system is received from the provider system via an application programming interface.

17. The non-transitory computer readable storage medium of claim 15, the operations further comprising transmitting the request to access the second web address to verify redirection to the first web address.

18. The non-transitory computer readable storage medium of claim 15, the operations further comprising receiving a file comprising the indication that the second listing is suppressed on the provider system.

19. The non-transitory computer readable storage medium of claim 15, the operations further comprising identifying a plurality of listings associated the entity, wherein the plurality of listings comprises the first listing, wherein each of the plurality of listings is associated with a confidence score, and wherein designating the first listing as the representative listing of the entity is based at least in part on a first confidence score associated with the first listing.

20. The non-transitory computer readable storage medium of claim 15, the operations further comprising generating an interface to receive, from the system associated with the entity, the instruction to suppress the second listing.

* * * * *